(12) United States Patent
Gonzalez et al.

(10) Patent No.: US 6,505,719 B2
(45) Date of Patent: Jan. 14, 2003

(54) DAMPING APPARATUS FOR BICYCLE FORKS

(75) Inventors: Jose L. Gonzalez, Fair Oaks Ranch, CA (US); Thomas Jesse Rogers, III, Valencia, CA (US)

(73) Assignee: Answer Products, Inc., Valencia, CA (US)

( * ) Notice: Subject to any disclaimer, the term of this patent is extended or adjusted under 35 U.S.C. 154(b) by 0 days.

(21) Appl. No.: 09/870,062

(22) Filed: May 30, 2001

(65) Prior Publication Data

US 2001/0040078 A1 Nov. 15, 2001

Related U.S. Application Data

(63) Continuation-in-part of application No. 09/081,157, filed on May 18, 1998, now Pat. No. 6,241,060.

(51) Int. Cl.[7] .............................................. B62K 25/08
(52) U.S. Cl. .................................... 188/319.2; 280/276
(58) Field of Search ............................. 188/266.4, 312, 188/313, 315, 318, 322.11, 322.15, 322.22; 280/276, 283, 284

(56) References Cited

U.S. PATENT DOCUMENTS

| 51,368 A | 12/1865 | Vose |
| 783,236 A | 2/1905 | Ashburn |
| 2,477,748 A | 8/1949 | Hutchins |

(List continued on next page.)

FOREIGN PATENT DOCUMENTS

| DE | 2 230 975 | 12/1972 |
| DE | 35 03 152 A1 | 8/1986 |
| EP | 0 172 708 A2 | 2/1986 |
| EP | 0 420 610 A1 | 4/1991 |
| EP | 0 834 448 A2 | 4/1998 |
| FR | 2206723 | 6/1974 |
| FR | 2460797 | * 7/1979 |
| FR | 2460797 | 1/1981 |
| GB | 264 003 | 1/1927 |
| GB | 469 697 | 7/1937 |
| GB | 529 305 | 11/1940 |
| GB | 585 122 | 1/1947 |
| GB | 2 026 635 | 2/1980 |
| GB | 1 588 267 | 4/1981 |
| GB | 2 088 994 A | 6/1982 |
| GB | 2 265 435 A | 9/1993 |
| JP | 62-3389 | 6/1985 |
| SE | 147 555 | 11/1954 |
| TW | 238646 | 1/1995 |
| TW | 282762 | 1/1996 |

OTHER PUBLICATIONS

*Answer Mountainbike Accessory Catalog*, 1996.
Answer Products; Date Unknown; "Championship Technology You Can Afford," ProForx ST and ProForx LT.
*Bicycling*, Apr. 1991; vol. 32; No. 3; p. 84; John Kukoda,; "Sproing! The shocking truth about those new suspension bikes; evaluation.".
*Bicycling*, Nov. 1992; vol. 33; No. 9; p. 74.
*Bicycling*, Apr. 1993; vol. 34; No. 4, p. 79; Geoff Drake, Scott Martin & Jim Langley; "Going Boing in Baja; Montain Bikes.".
*Bicycling*, Aug. 1993, pp. 88–92; "Shocking News, a Buyer's Guide to Choosing and Installing a Front Suspension Fork.".

(List continued on next page.)

*Primary Examiner*—Christopher P. Schwartz
(74) *Attorney, Agent, or Firm*—Barnes & Thornburg

(57) ABSTRACT

A damping apparatus having a cylinder, a fluid, and a floating piston. The cylinder includes a fluid chamber with the fluid located within the fluid chamber. The floating piston is coupled to the cylinder to carry the fluid in the fluid chamber. The floating piston is movable in response to movement of the fluid when a force is applied to the cylinder.

20 Claims, 17 Drawing Sheets

U.S. PATENT DOCUMENTS

| | | |
|---|---|---|
| 2,560,627 A | 7/1951 | Boschi |
| 2,683,034 A | 7/1954 | Seddon |
| 2,683,044 A | 7/1954 | Seddon |
| 2,708,112 A | 5/1955 | Seddon et al. |
| 2,743,102 A | 4/1956 | Seddon et al. |
| 2,756,070 A | 7/1956 | Torre |
| 3,083,038 A | 3/1963 | Moulton |
| 3,256,950 A | 6/1966 | Casimir |
| 3,312,312 A | 4/1967 | Bourcier de Carbon |
| 3,380,557 A | 4/1968 | Peterson |
| 3,606,295 A | 9/1971 | Appleton |
| 3,827,538 A | 8/1974 | Morgan |
| 3,837,445 A | 9/1974 | Pierle |
| 3,936,076 A | 2/1976 | Probst |
| 4,037,855 A | 7/1977 | Smith |
| 4,057,264 A | 11/1977 | Shuzuki et al. |
| 4,145,067 A | 3/1979 | Ceriani |
| 4,260,170 A | 4/1981 | Terai et al. |
| 4,278,266 A | 7/1981 | Inoue et al. |
| 4,352,487 A | 10/1982 | Shtarkman |
| 4,401,298 A | 8/1983 | Eaton et al. |
| 4,421,337 A | 12/1983 | Pratt |
| 4,464,986 A | 8/1984 | Bollani |
| 4,558,878 A | 12/1985 | Motrence |
| 4,561,669 A | 12/1985 | Simons |
| 4,566,712 A | 1/1986 | Montrenec |
| 4,570,963 A | 2/1986 | Isono |
| 4,756,512 A | 7/1988 | Toms, Jr. |
| 4,757,884 A | 7/1988 | Fannin et al. |
| 4,795,009 A | 1/1989 | Tanahashi et al. |
| 4,802,561 A | 2/1989 | Knecht et al. |
| 4,815,763 A | 3/1989 | Hartmann |
| 4,834,222 A | 5/1989 | Kato et al. |
| 4,834,223 A | 5/1989 | Kawamura et al. |
| 4,961,482 A | 10/1990 | Pohlenz et al. |
| 4,964,625 A | 10/1990 | Kawamura |
| 4,971,344 A | 11/1990 | Turner |
| 5,042,625 A | 8/1991 | Maus |
| 5,044,648 A | 9/1991 | Knapp |
| 5,060,961 A | 10/1991 | Bontrager |
| 5,088,705 A | 2/1992 | Tsai |
| 5,092,421 A | 3/1992 | Tsurumaki et al. |
| 5,098,120 A | 3/1992 | Hayashi et al. |
| 5,158,161 A | 10/1992 | Yamaoka et al. |
| 5,184,703 A | 2/1993 | Van Zeggeren |
| 5,186,481 A | 2/1993 | Turner |
| 5,193,832 A | 3/1993 | Wilson et al. |
| 5,193,833 A | 3/1993 | Reisinger |
| 5,195,766 A | 3/1993 | Dohrmann et al. |
| 5,238,259 A | 8/1993 | Wilson et al. |
| 5,246,092 A | 9/1993 | Yamaoka |
| 5,248,159 A | 9/1993 | Moore |
| 5,269,549 A | 12/1993 | Wilson et al. |
| 5,275,264 A | 1/1994 | Isella |
| 5,277,283 A | 1/1994 | Yamaoka et al. |
| 5,284,352 A | 2/1994 | Chen |
| 5,301,973 A | 4/1994 | Truchinski |
| 5,308,099 A | 5/1994 | Browning |
| 5,310,203 A | 5/1994 | Chen |
| 5,320,374 A | 6/1994 | Farris et al. |
| 5,350,185 A | 9/1994 | Robinson |
| 5,360,089 A * | 11/1994 | Nakamura et al. .......... 188/299 |
| 5,380,026 A | 1/1995 | Robinson |
| 5,382,037 A | 1/1995 | Chang et al. |
| 5,398,954 A | 3/1995 | Chonan |
| 5,405,159 A | 4/1995 | Klein et al. |
| 5,417,446 A | 5/1995 | Pileggi |
| 5,445,401 A | 8/1995 | Bradbury |
| 5,456,480 A | 10/1995 | Turner et al. |
| 5,460,357 A | 10/1995 | Stewart |
| 5,470,090 A | 11/1995 | Stewart et al. |
| 5,494,302 A | 2/1996 | Farris et al. |
| D368,054 S | 3/1996 | Behrens et al. |
| 5,499,189 A | 3/1996 | Seitz et al. |
| D368,681 S | 4/1996 | Behrens et al. |
| 5,509,675 A | 4/1996 | Barnett |
| 5,509,677 A | 4/1996 | Bradbury |
| 5,533,597 A | 7/1996 | Nezu et al. |
| RE35,401 E | 12/1996 | Wilson et al. |
| 5,580,075 A | 12/1996 | Turner et al. |
| 5,597,169 A | 1/1997 | Bradbury |
| 5,848,675 A | 12/1998 | Gonzalez |
| 5,934,697 A | 8/1999 | McAndrews |
| 5,954,167 A * | 9/1999 | Richardson et al. ........ 188/275 |
| 6,026,939 A | 2/2000 | Girvin et al. |
| 6,042,091 A | 3/2000 | Marzocchi et al. |
| 6,105,987 A | 8/2000 | Turner |
| 6,120,049 A | 9/2000 | Gonzalez et al. |
| 6,241,060 B1 * | 6/2001 | Gonzalez et al. ........ 188/319.2 |

OTHER PUBLICATIONS

*Bicycling*, Date Unknown; pp. 98 and 102; "Technical Q&A.".
Bicycle Technologies International Ltd., Fall 1994, 3 pages.
*Cycling Science*, Fall 1992; pp. 6–12; "Bicycle Suspension Systems Meet Mr. Simple Dynamics".
European Search Report, completed Aug. 28, 1998, mailed Sep. 24, 1998.
*Guide to Suspension*, Date Unknown; Suspension Speak: Sprechen sie suspension? No? Think of this as a Sort Berlitz–Krieg guide to the language of suspension!.
*Guide to Suspension*, Date Unknown; Active Suspension: Running down the list of compontents and systems are dedicated to the purpose of shock absorption!.
*Guide to Suspension*, vol. 3; 1992; Various articles and advertisements, pp. 13–119.
*Judy Cartridge System Owner's Manual*, 1995.
*Judy Cartridge System Service Manual*, 1995.
*Judy Cartridge System Owner's Manual*,Date Unknown.
*Judy Cartridge System, Judy DHO Owner's Manual*, Date Unknown.
*Judy Cartridge System; Judy Owner's Manual*, 1997.
Mountainbike Accessory Catalogue, 1995.
*Mountain Bike Action*, Mar. 1993; Rock Shox Rocks the Boat.
*Rock Shox Small Parts Catalog*, 1995.
*Rock Shox, Judy Cartridge System Service Manual*, 1996.
*Rock Shox Small Parts Catalog*, 1996.
*Rock Shox Product Info.*, 1996.
*Rock Shox Productline*, 1997.
*Rock Shox Small Parts Catalog*, 1997.
*Rock Shox USA, The new world of RockShox*, 1997.
*Rock Shox Flash Cards*, 1995.
*Rock Shox, Frisky, A Scratching Post for your Mind*, Issue #1, vol. 1, 1996; various ads and articles.
*Rock Shox Catalog*, 1996.
*Owner's Service Manual*, Suzuki RM250, Suzuki Motor Corporation, Jul. 1994, front cover and pp. 15–1 through 15–7.
*1994 Twin Chamber Showa RM Forks*, "Suspension and Chassia—Cartridge Fork Service and Tuning," p. 49.
Service Manual's Depiction of Showa Suspension—1994 (figure).
1993 Kawasaki (figure).
1994 Suzuki (figure).
*Mountain Bike Action*, Jan. 1994, front page.

*Mountain & City Biking*, Date Unknown, p. 59; Slingshot: Who says suspension is all new? These guys have been refining theirs since 1980.

*NW6a Owners Manual*, Jan. 23, 1986.

*Part Drawing*, Date Unknown.

*Popular Science*, May 1993; vol. 242; No. 5; p. 84; Marcelle M. Soviero, Kevin Cameron; Easy Riders: A New Breed of Mountain Bikes with High–Tech Suspensions . . .

*Rock Shox*, Date Unknown; Advertisement for "The New Stuff."

*Rock Shox Small Parts Catalog*, 1994.

*Rock Shox*, 1996; Advertisement for "Garden Variety 1996."

*Rock Shox*, Dates Unknown, Various advertisements for "Judy Cartridge System" and Judy Accessories.

*Rock Sox Mag*, Feb.; John Kukoda; Suspension of the Month: Rock Shox Mag 21.

* cited by examiner

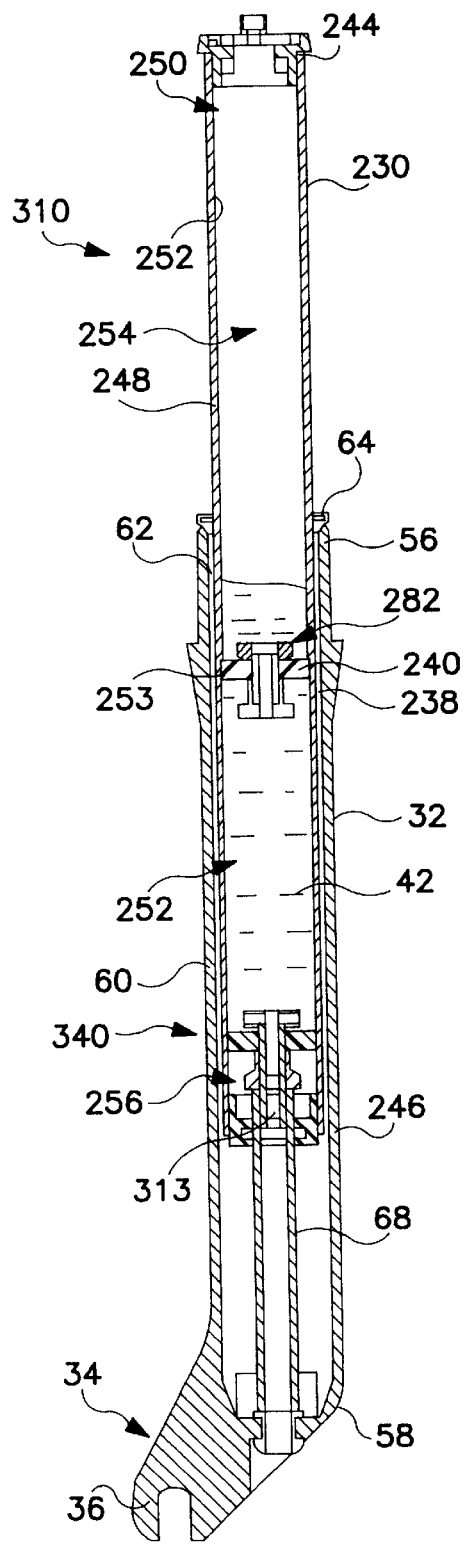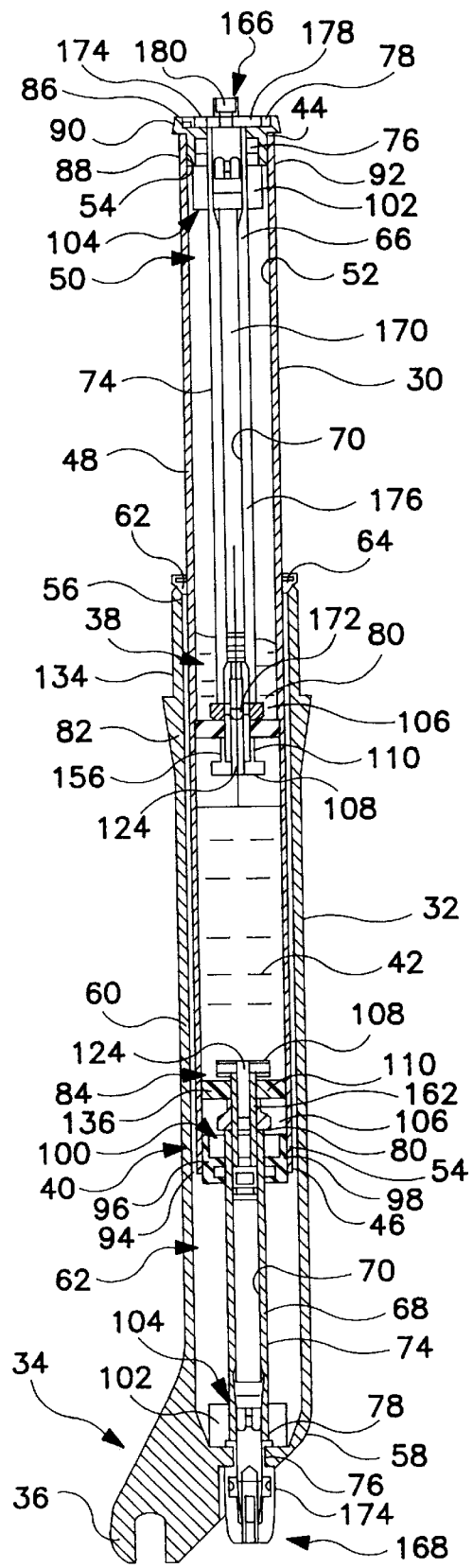

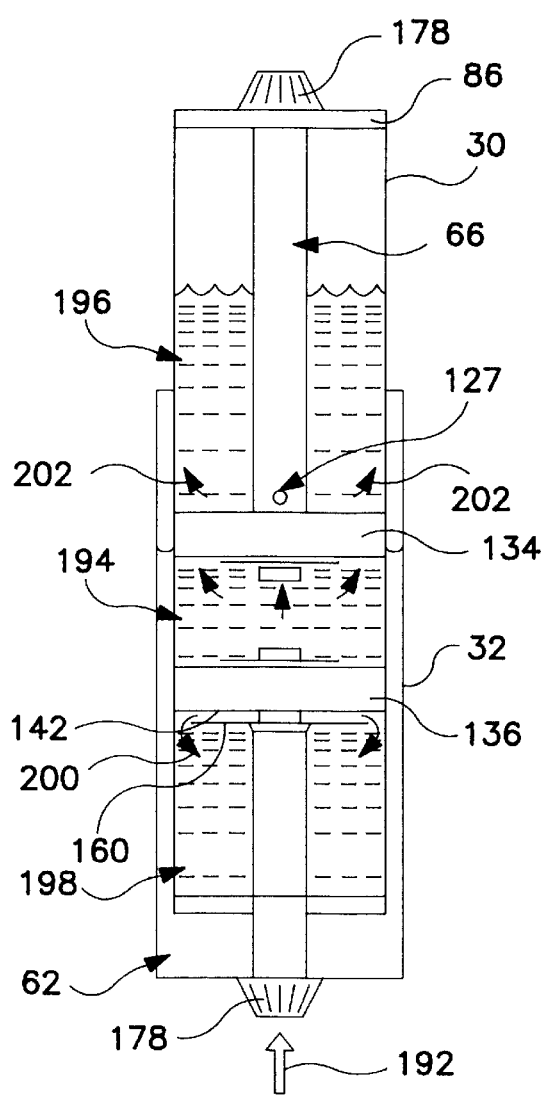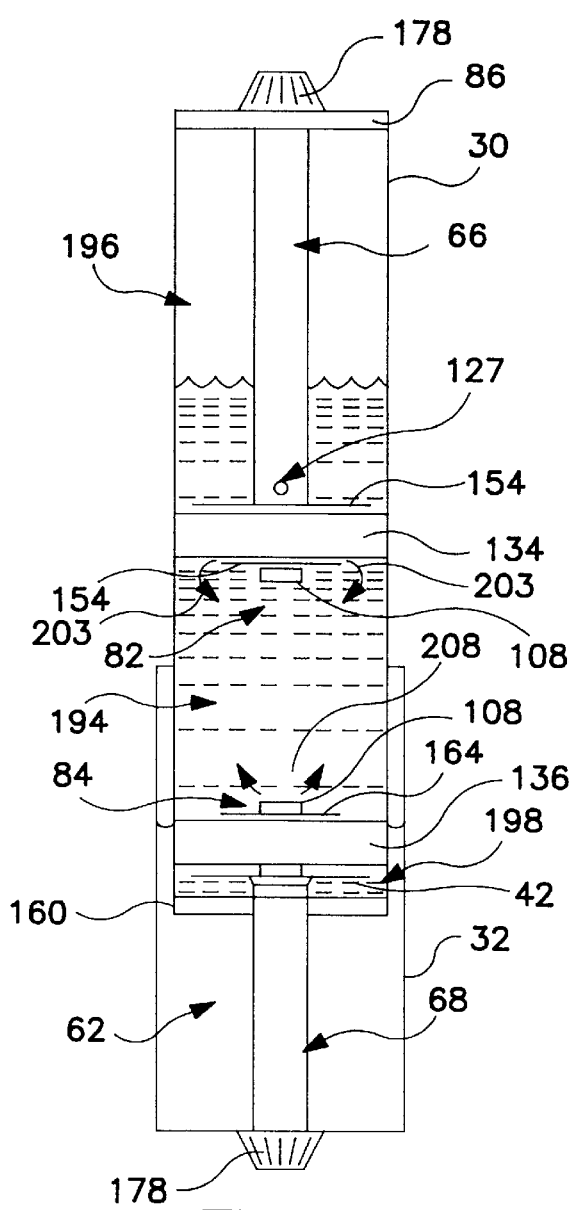
FIG. 6
FIG. 7

DAMPING APPARATUS FOR BICYCLE FORKS

RELATED APPLICATION

The present disclosure is a continuation-in-part of U.S. patent application Ser. No. 09/081,157, filed May 18, 1998 now U.S. Pat. No. 6,241,060, entitled DAMPING APPARATUS FOR BICYCLE FORKS, the complete disclosure of which is hereby expressly incorporated by reference.

BACKGROUND AND SUMMARY

The present invention is related to damping apparatus for use with bicycle forks, and more particularly, to damping apparatus of the type that provides fluid damping.

Conventional bicycle forks connect a front wheel of a bicycle to a bicycle frame so that the rider can rotate the front wheel and steer the bicycle. The bicycle fork typically includes a fork steerer tube that is easily rotated by handlebars. The steerer tube is coupled to a fork crown that extends across the top of the bicycle wheel. Two blades extend from opposing ends of the fork crown on opposite sides of the wheel to securely attach the crown to opposite sides of an axle of the front bicycle wheel.

Bicycle forks are not only used to steer bicycles, but they are also used to absorb various loads that are experienced by the front wheel of such bicycles. These conventional bicycle forks are known to include inner and outer telescoping members that are compressible toward one another and expandable away from one another to absorb shock.

In rough terrain, however, these telescoping bicycle forks often rebound too rapidly after hitting a large bump. Some bicycle riders have also found that traditional telescoping bicycle forks compress too rapidly upon hitting bumps. Therefore, manufacturers of bicycle forks have developed damping apparatuses that have damping mechanisms for controlling the relative movement between the telescoping members.

Although bicycle riders have embraced damping bicycle forks, as riders maneuver their bicycles over rougher terrain for longer lengths of time heat, build-up within the damping fluid can cause some traditional forks to "seize" due to pressure buildup from the fluid expanding in a closed system. It would, thus, be desirable to provide a damping apparatus for forks that allows for the fluid to expand while being pressurized. In addition, it is commonly known in the art that weight is an undesirable factor in bicycle design. Accordingly, it would be further desirable to provide such a damping system that is not complex and does not add unnecessary weight to the bicycle.

An illustrative embodiment of a bicycle fork provides a damping apparatus comprising a cylinder, a fluid, and a floating piston. The cylinder includes a fluid chamber with the fluid located within the fluid chamber. The floating piston is coupled to the cylinder and is configured to carry the fluid in the fluid chamber. The floating piston is also configured to be movable in response to movement of the fluid when a force is applied to the cylinder. Further embodiments of the damping apparatus may include the floating piston defining one end of the fluid chamber. The cylinder may provide a second chamber adjacent the fluid chamber and be separated from the fluid chamber by the floating piston. A member may be included that is disposed in the cylinder and is configured to displace fluid. The displacement biases the fluid against the floating piston. A bias member may be included to bias the floating piston against of fluid.

Another illustrative embodiment of the bicycle fork provides a damping apparatus further comprising a second piston. The second piston is disposed in the fluid chamber and is movable relative to the cylinder. Additional illustrative embodiments include a second cylinder configured to telescopically receive the first cylinder.

Another illustrative embodiment of the bicycle fork comprises a crown member, a first leg and a second leg. The first leg depends from the crown member and comprises a damping apparatus. The damping apparatus comprises a cylinder having a fluid chamber, a fluid located within the fluid chamber, and a floating piston coupled to the cylinder. The floating piston is configured to carry the fluid in the fluid chamber, and is configured to be movable in response to movement of the fluid when an external force is applied to the cylinder. The second leg also depends from the crown member and is spaced apart from the first leg. The second leg includes a spring apparatus comprising a second cylinder and a spring disposed in the second cylinder. The spring is configured to compress in response to the external force applied to the second cylinder.

Another illustrative embodiment of the damping apparatus comprises a cylinder, a piston, a fluid, and a resilient member. The cylinder is defined by a longitudinally-extending inner wall and comprises coaxially-aligned first and second fluid chambers that are disposed within the cylinder. The piston is disposed within the cylinder to separate the first and second fluid chambers. The piston also comprises at least one aperture disposed therethrough to allow communication between the chambers. The fluid is located within both the first and second chambers. The resilient member is located within the second chamber adjacent the inner wall, as well as located between the inner wall and a volume of the fluid. As a shock force is applied longitudinally against the cylinder, the fluid in the second chamber is caused to apply a lateral force against the resilient member. This force compresses the resilient member against the inner wall to allow an increase in volume of the fluid that occupies the second chamber.

Additional features and advantages of the apparatus will become apparent to those skilled in the art upon consideration of the following detailed descriptions exemplifying the best mode of carrying out the apparatus as presently perceived.

BRIEF DESCRIPTION OF THE DRAWINGS

The illustrative apparatus will be described hereinafter with reference to the attached drawings, which are given as non-limiting examples only, in which:

FIG. 2 is a cross-sectional view of the damping apparatus showing the damping apparatus having an upper leg formed for slidable extension into a lower leg, compression piston unit mounted in the upper leg, a rebound piston unit mounted on the lower leg and extending into the upper leg, and an oil bath situated in the upper leg between the compression and rebound piston units;

FIG. 6 is a diagrammatic illustration of the damping apparatus showing compression of the upper leg into the lower leg;

FIG. 7 is a diagrammatic illustration of the damping apparatus showing the upper leg as it moves out from the lower leg to an extended position;

FIG. 9 is another cross-sectional view of an alternative embodiment of the damping apparatus showing a compression piston unit and a rebound piston unit;

Corresponding reference characters indicate corresponding parts throughout the several views. The exemplification set out herein illustrates several embodiments of the apparatus, and such exemplification is not to be construed as limiting the scope of the apparatus in any manner.

DETAILED DESCRIPTION OF THE DRAWINGS

Figure 1:
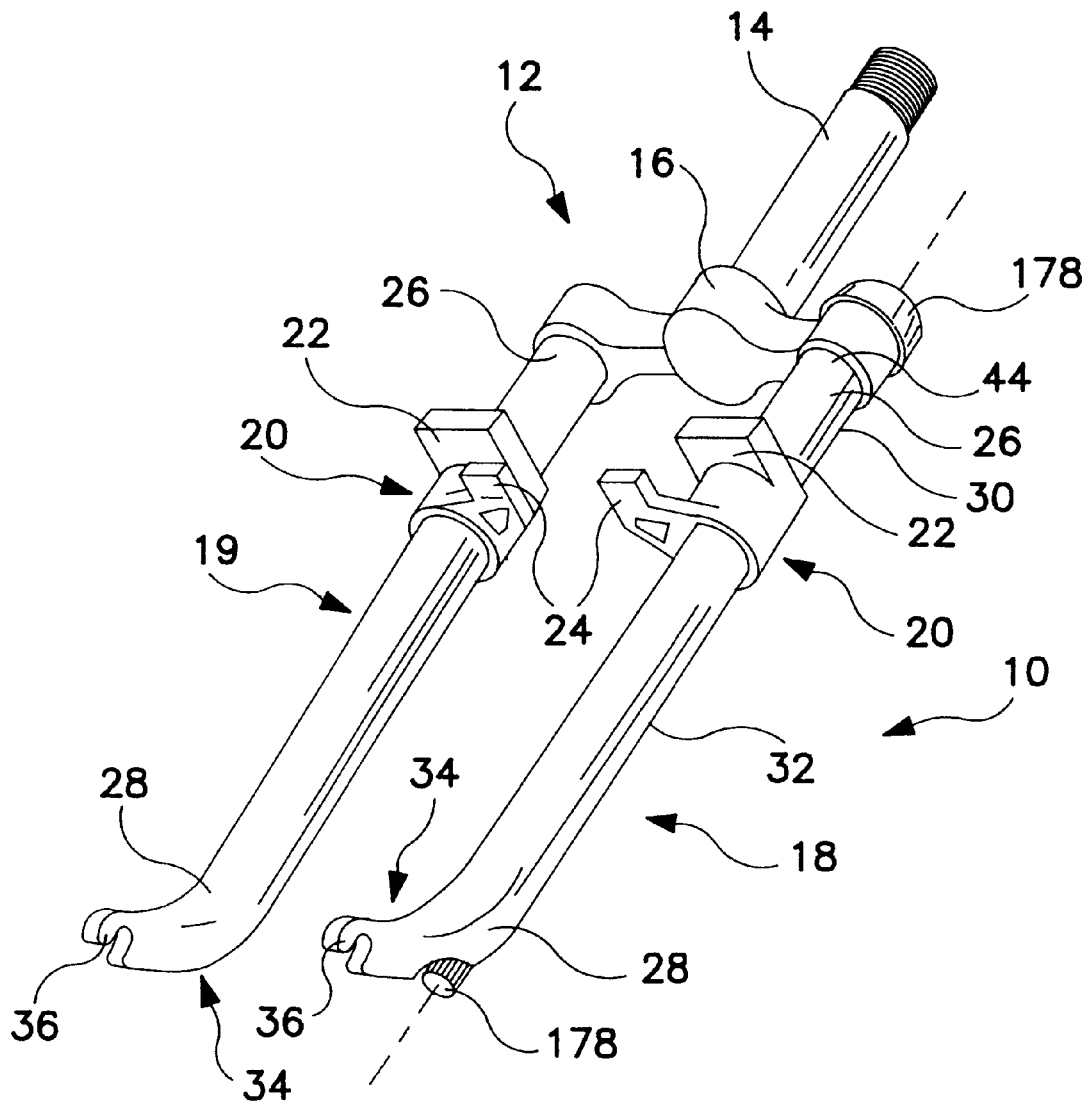
FIG. 1 is a perspective view of a bicycle fork that includes the damping apparatus.

A damping apparatus 10 is formed for use in a suspension bicycle fork 12 mounted between a bicycle frame (not shown) and a front wheel axle (not shown). The bicycle fork 12 includes a steerer tube 14, a crown 16, two parallel fork legs 18, 19 and two brake flanges 20. Each brake flange 20 has a brake arch receiver 22 at one end for mounting a brake arch (not shown) thereon and a rim brake post receiver 24 at the other end for mounting a brake post (not shown). Each fork leg 18, 19 has an upper end 26 and a lower end 28. The upper ends 26 of the fork legs 18, 19 are connected to the crown 16 and the lower ends 28 of each of the fork legs 18, 19 form a dropout 34 that has a wheel axle catch portion 36 thereon. The damping apparatus 10 of the present invention is formed for use with one of the fork legs 18, 20, and includes an upper leg 30 and a lower leg 32 that slide relative to one another. The damping apparatus 10 also includes a compression piston unit 38 coupled to the upper leg 30, a rebound piston unit 40 coupled to the both the upper and lower legs 30, 32, and an oil bed cartridge 42 engaging the compression and rebound piston unit 38, 40. See FIG. 2. The oil is free to flow in the lower leg between the inner and outer ends 46,44.

The upper leg 30 of the damping apparatus 10 is preferably the upper end 26 of the fork leg 18. The upper leg 30 has an outer end 44 coupled to the crown 16, an opposite inner end 46, and a center portion 48 being formed to define a cavity 50 between the opposite ends 44, 46. Illustratively, the center portion 48 of the upper leg 30 includes an interior face 52 having threads 54 formed at both the outer and inner ends 44, 46. The lower leg 32 of the damping apparatus 10 is preferably the lower end 28 of the fork leg 18. See FIG. 1. The lower leg 32 has a top end 56, an opposite bottom end 58, and a generally cylindrical side wall 60 defining a chamber 62 between the top and bottom ends 56, 58. The top end 56 of the lower leg 32 forms a rim 64 having a diameter sized to receive the inner end 46 and the center portion 48 of the upper leg 30 therethrough. See FIG. 2. The outer diameter of the upper leg 30 fits the inner diameter of the lower leg 32 so that the upper leg 30 is slidably engaged with the lower leg 32.

The ability of the upper leg 30 to slide into the lower leg 32 is affected by the compression piston unit 38. In contrast, the ability of the upper leg 30 to slide out of the lower leg 32 is affected by the rebound piston unit 40. The compression piston unit 38 includes a compression shaft 66 and the rebound piston unit 40 includes a rebound shaft 68. The shafts 66, 68 each have opposite ends 78, 80, an internal face 70 defining a passage 72, and an external face 74. Threads 75 extend about the internal face 70 at the second end 80, and threads 76 extend about the external face 74 at the first end 78. See FIGS. 2 and 3. As shown in FIG. 2, the shaft 66 of the compression piston unit 38 has a length suitable to position its second end 80 within the cavity 50 of the upper leg 30. In addition, the compression piston unit 38 includes a compression coupler 82 coupled to the second end 80 of the shaft 66. The shaft 68 of the rebound piston unit 40 has a length that is less than the length of the compression shaft 66, but sufficient to position its second end 80 within the cavity 50. The rebound piston unit 40 includes a rebound coupler 84 coupled to the second end 80 of the rebound shaft 68 situated within the cavity 50.

As shown in FIG. 2, the compression piston unit 38 includes a fork cap 86 coupled to the first end 78 of the shaft 66 opposite the coupler 82. This cap 86 includes a threaded aperture 88 therethrough that corresponds with the threads 76 on the external face 74 of the shaft 66. The fork cap 86 also includes an exterior surface 90 with threads 92 extending about the circumference of the surface 90. The threads 54 at the outer end 44 of the upper leg 30 correspond with the threads 92 formed on the exterior surface 90 of the fork cap 86. Thus, the compression piston unit 38 is securely mounted in the cavity 50 of the upper leg 30.

An end plug 94 is secured in the inner end 46 of the upper leg 30. The end plug 94 is sized for extension into the cavity 50 of the upper leg 30 and includes a side wall 96 having threads 98 thereon that correspond to the threads 54 on the interior face 52 of the upper leg 30. In addition, the end plug 94 includes an aperture 100 therethrough that is sized for slidable extension of the rebound shaft 68 therethrough. Moreover, individual tubular seals 102 are situated on the fork cap 86 and at the bottom end 58 of the lower leg 32. Each seal 102 is formed to have an aperture 104 therethrough that is sized to snugly receive the respective shafts 66, 68 therein.

The couplers 82, 84 of the respective compression and rebound piston units 38, 40 are formed similarly to one another. Each coupler 82, 84 is barbell-shaped when assembled and has opposite disc-shaped ends 106, 108 and a cylindrical hollow post 110 extending between the disc-shaped ends 106, 108. See FIGS. 3 and 4. The outer disc 106 of each of the barbell-shaped coupler 82, 84 is mounted on the second end 80 of the respective shafts 66, 68, and the opposite inner disc 108 extends into the cavity 50 of the upper leg 30. The outer and inner discs 106, 108 are shallow in width and circular in plan view. The outer disc 106 of each coupler 82, 84 has a first circle 112 engaging the second end 80 of the respective shafts 66, 68 and a second circle 114 engaging the hollow post 110. The inner discs 108 each have a third circle 116 engaging the hollow post 110 and a fourth opposite circle 118. A radially outer peripheral surface 120 extends between the first circle 112 and the second circle 114, and a radially outer sidewall 122 extends between the third circle 116 and the fourth circle 118, respectively.

As best shown in FIG. 2, the outer and inner discs 106, 108 are each formed to include a central oil flow aperture 124 extending through the first and second circles 112, 114 and the third and fourth circles 116, 118, respectively. The central oil flow apertures 124 in each disc 106, 108 are in fluid communication with one another via the hollow post 110 extending between the outer and inner discs 106, 108. In addition, the sidewall 122 of the inner discs 108 are each formed to include four spaced-apart peripheral oil flow apertures 126, each in communication with the central oil flow aperture 124. The hollow post 110 includes dual apertures 127 extending therethrough generally perpendicular to the central oil flow aperture 124. In addition, the outer discs 106 each include two oil flow slots 128 in communication with the central oil flow aperture 124. The oil flow slots 128 are generally aligned with the dual apertures 127 and are positioned in a linear relation to one another through the fourth circle 118 and the sidewall 122 of the outer discs 106.

The hollow post 110 of the barbell-shaped couplers 82, 84 is preferably integral with the inner disc 108. The end of the hollow post 110, extending away from the inner disc 108, preferably includes threads 130 that are sized for engagement with the threads 75 on the internal face 70 of each shaft 66, 68. A stationary compression piston 134 and a moveable rebound piston 136 are press-fit on the hollow post 110 between the discs 106, 108. The compression piston 134 and the rebound piston 136 each include a mounting aperture 138 that is sized for extension of the hollow post 110 therethrough. The hollow posts 110 each extend through the mounting aperture 138 of the respective pistons 134, 136. A spacer 132 is positioned on the post 110 to securely fasten the respective pistons 134, 136 in place. The spacer 132 on the post 110 of the coupler 82 mounts the piston 134 adjacent the outer disc 106. See FIGS. 2 and 3. The spacer 132 on the post 110 of the coupler 84 mounts the piston 136 adjacent the inner disc 108. See FIGS. 2 and 4.

Figure 5:
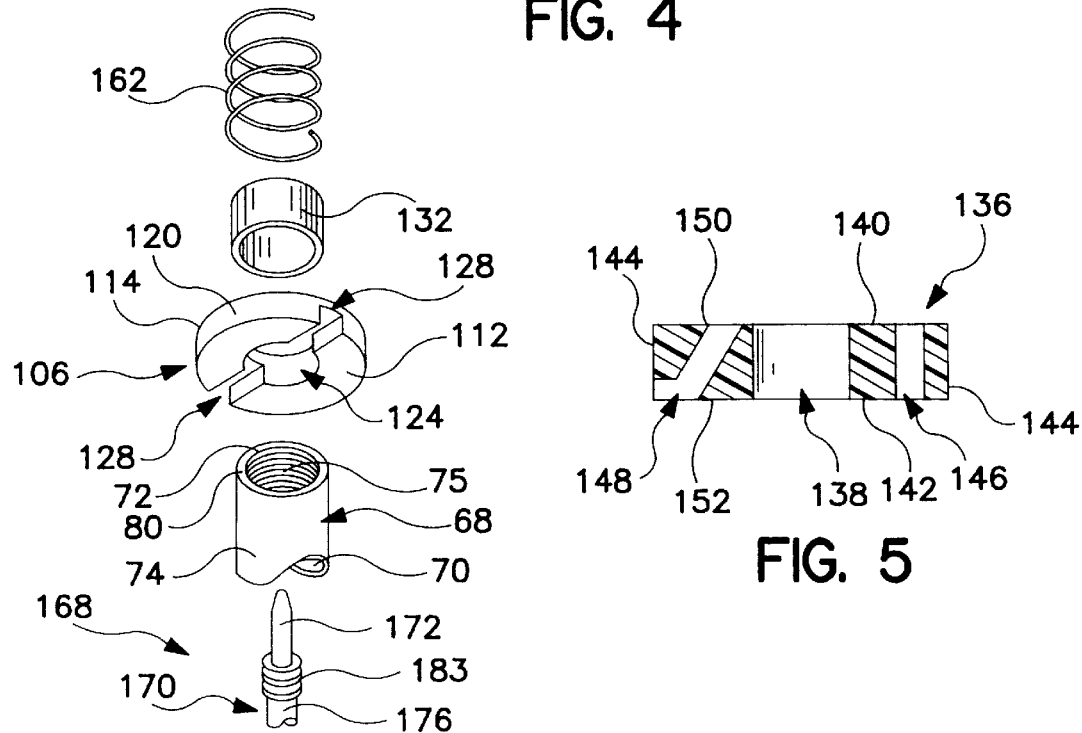
FIG. 5 is a cross-sectional view of the rebound piston taken along line 5—5 of FIG. 4.

The compression and rebound pistons 136, 138 have the same configuration and each have a first face 140 more proximal to the inner disc 108 and an opposite face 142 more proximal to the outer disc 110 in the assembled damper apparatus 10. A radially outer peripheral surface or sidewall 144 of each piston 136, 138 extends between the opposite faces 142. The diameter of the peripheral surface 144 is sized to fit the inner diameter of the upper leg 30. See FIG. 2. Thus, oil 42 is substantially blocked from flowing between the side wall 144 of the pistons 136, 138 and the interior face 52 of the upper leg 30 during compression or extension between the upper and lower legs 30, 32. The pistons 136, 138 are each formed to include three spaced-apart slots 146 extending through the opposing. faces 140, 142. See, for example, FIG. 5. In addition, three angled apertures 148 are situated through the opposing faces 140, 142 in a spaced-apart relationship to one another between the three slots 146. The apertures 148 are defined by opposite mouths 150, 152. The apertures 148 are angled in a manner that positions the first mouth 150 through the first face 140 of the pistons 136, 138 adjacent the mounting aperture 148, and the opposite step-up mouth 152 in a position that overlaps the second face 142 and the outer periphery 144. It is understood that greater than or less than three slots 146 or apertures 148 may extend through the pistons 134, 136, so long as there is at least one slot or aperture therethrough.

Figure 3:
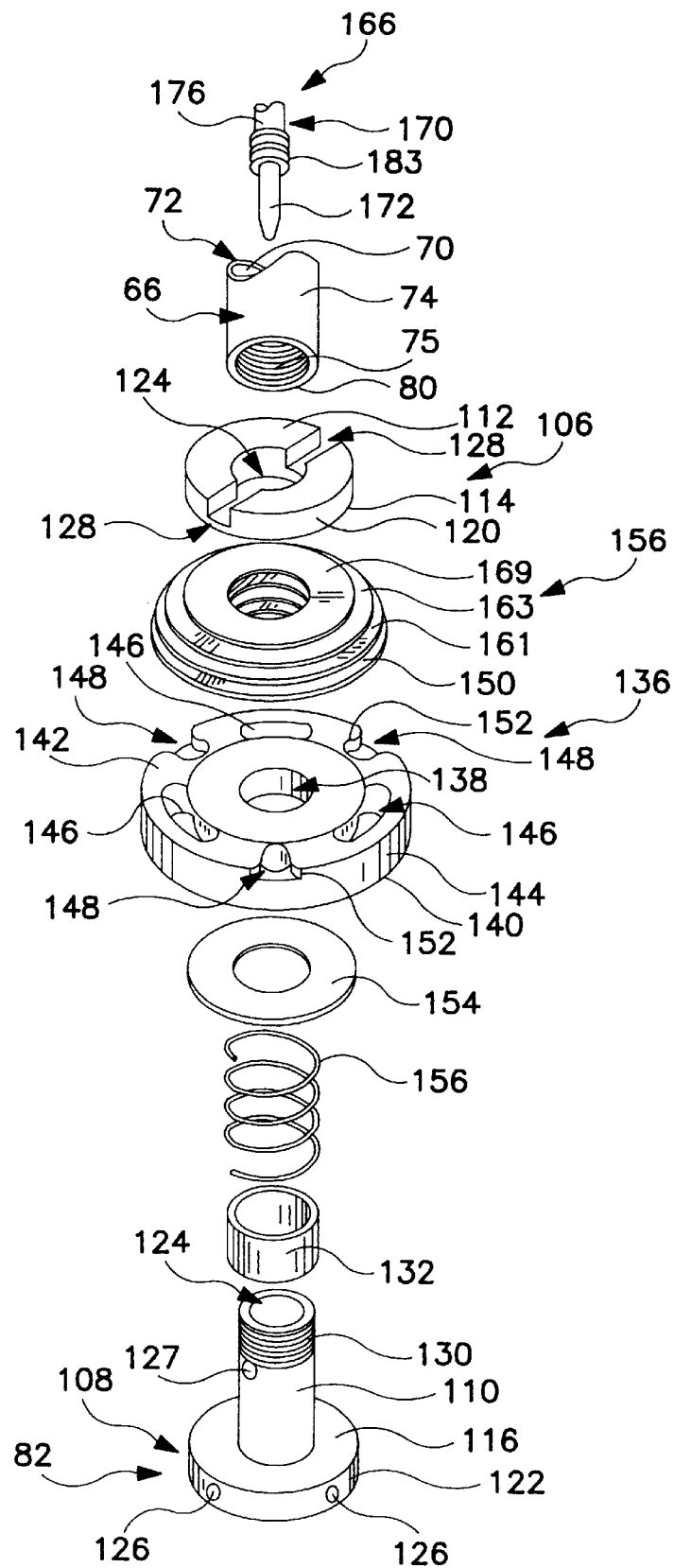
FIG. 3 is an exploded perspective view of a portion of the compression piston unit showing a coupler, a shim stack, a compression piston, a movable valve, a shaft, and a needle formed to extended into the coupler.

As best shown in FIG. 3, the compression piston 134 is formed to be mounted on the hollow post 110 of the coupler 82 adjacent the outer disc 106. A movable valve 154 is positioned on the hollow post 110 between the face 142 of the piston 134 and the inner disc 108. A spring 156 normally biases the valve 154 against the first face 140 of the piston 134. The movable valve 154 preferably has a diameter substantially equivalent to the diameter of the inner disc 108. Thus, the diameter of the movable valve 154 is sufficient only to cover the mouths 150 of the three apertures 148. A shim 158 is positioned on the hollow post 110 between the second face 142 of the piston 134 and the outer disc 106 of the coupler 82. The shim 158 has a diameter that is slightly less than the diameter of the piston 134. Thus, the shim 158 substantially covers the spaced-apart slots 146, but leaves the step-up mouths 152 of the apertures 148 open. Preferably, the apparatus 10 includes a shim stack 159 between the piston 134 and disc 106. The stack 159 includes shims 158, 161, 163, 169 that decrease in size as they are stacked from the piston 134 to the outer disc 106. It is understood that the number, order, and size of shims in the stack 159 may be varied to accommodate riders of different weight and to alter the compression damping of the apparatus 10.

The shim 158 is not movable and although the moveable valve 154 does not cover the three slots 146, the shim 158 permanently blocks three spaced-apart slots 146 extending through the piston 134 from oil flow therethrough. Importantly, the mouth 152 of the three apertures 148 remains open through the second face 142. The three apertures 148 are opened through the first face 140 of the piston 134, however, only when the fluid flow pressure is such that the valve 154 is moved against the spring 156 toward disc 108.

Figure 4:
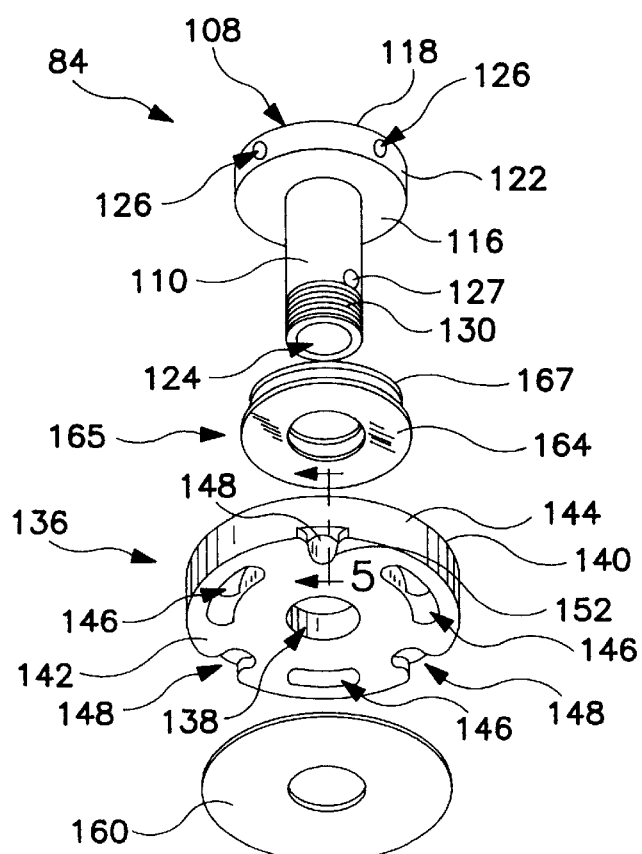
FIG. 4 is an enlarged exploded perspective view of a portion of the rebound piston unit showing a coupler, a shim stack, a rebound piston, a movable valve, a shaft, and a needle formed to extend into the coupler.

Referring now to FIG. 4, the rebound piston 136 is mounted on the hollow post 110 of the coupler 84 adjacent the outer disc 106. A movable valve 160 is positioned on the hollow post 110 between the outer disc 106 and the piston 136, and is normally biased against the second face 142 of the piston 136 by a spring 162. This movable valve 160 has a diameter that is slightly less than the diameter of the piston 136. Thus, the moveable valve 160 selectively covers the three spaced-apart slots 146. A shim 164 is positioned on the hollow post 110 between the first face 140 of the piston 136 and the inner disc 108 of the coupler 84. The shim 164 has a diameter that is substantially equivalent to the diameter of the inner disc 108. Thus, the shim 164 only covers the mouths 150 of the three apertures 148. The shim 164 is pressed against the piston 136 and, therefore, covers the mouths 150 of the three angled apertures 148. In preferred embodiments, a shim stack 165 is situated between the piston 136 and the disc 108. The shim stack 165 includes shim 164 and shim 167. Shim 167 has a diameter that is less than shim 164. It is understood that the number, order, and size of shims in stack 165 may be changed to manipulate the stiffness of the rebound.

The damping apparatus 10 of the present invention further includes a compression adjustment mechanism 166 and a rebound adjustment mechanism 168. The mechanisms 166, 168 each cooperate with the respective couplers 82, 84. Each of the adjustment mechanisms 166, 168 include a needle 170 having a pointed end 172, an opposite end 174, a cylindrical side wall 176 extending between the ends 172, 174, and a knob 178 coupled to the opposite end 174 of the needle 170. Illustratively, the pointed end 172 of the needle 170 is positioned adjacent the respective coupler 82, 84, and the knob 178 is coupled to the opposite end 174 of the needle 170 by a screw 180. It is understood, however, that pins, rivets, staples, adhesives, and other well known attachment means may be used to couple the knob 178 to the needle 170. Illustratively, spaced-apart seals 183 are situated on the side wall 176 and threads 181 extend about the cylindrical side wall 176 of the needle 170.

The passage 72 in each of the shafts 66, 68 of the compression and the rebound units 38, 40 is sized to receive the needle 170 therein. The passage 72 is formed to include a first section 182 having a first diameter sized to receive the side wall 176 of the needle 170 therein and a second section 188 extending from the first section 182. In preferred embodiments, grease or oil is provided in the passage 72 to provide lubrication for manipulating the needle 170 in the first section 182 of the passage 72. The third section 188 is formed to have a diameter that is greater in size than the diameter of the first section 182. The third section 188 is sized to receive the knob 178 therein and includes threads 190 about its periphery that are formed to correspond with the threads 181 on the needle 170.

The compression piston unit 38 allows a user to adjust the stiffness of the bicycle fork 12. This adjustment is achieved by turning the knob 178 of the compression adjustment mechanism 166. The knob 178 selectively drives the needle 170 up or down in the passage 72 to adjust the positing of the pointed end 172 of the needle 170 in the hollow post 110 of the coupler 82. This relative positioning alters the flow diameter of the oil flow aperture 124 and, thus, the ability of the oil 42 to flow through the piston 134.

Adjustment of the knob 178 reduces the flow of fluid through the compression piston 134 for small bumps and, thus, stiffens the compression response of the bicycle fork 12. The oil flow aperture 148 remains open, however, so with large bumps, the upward pressure of the lower leg 32, as shown by arrow 192, forces the flow through the apertures 127 and past the compression piston 134, as shown by arrows 202. See FIG. 6. Thus, the upper leg 30 moves into the outer leg 32 and, thus, absorbs the shock of the large bump.

The rebound piston 136 beneficially allows the user to individually adjust the speed/stiffness of the rebound of the bicycle fork 12. This adjustment is achieved by turning the knob 178 of the rebound adjustment mechanism 166. Turning the rebound assembly knob 178 drives the needle 170 up or down in the passage 72 to adjust the positioning of the pointed end 172 of the needle 170 in the hollow post 110 of coupler 84. The extent to which the needle 170 is positioned in the post 110 alters the flow diameter of the aperture 124 and, thus, the rate of fluid flow through the coupler 84. Therefore, as the needle 170 is adjusted to reduce the diameter of the aperture 124, fluid is slowed as it passes into the two oil flow slots 128 in the outer disc 106 of the coupler 84, thus, slowing the rebound of the fork 12.

The relative positioning of the compression coupler 82 and the rebound coupler 84 within the cavity 50 of the upper leg 30 in the assembled damping apparatus 10 creates three flow zones within the cavity 50. The first normal zone 194 is situated in the cavity 50 between the inner disc 108 of the compression coupler 82 and the inner disc 108 of the rebound coupler 84. The second compression zone 196 is situated between the second face 142 of the piston 134 and the fork cap 86 mounted in the outer end 44 of the upper leg 30. The third rebound zone 198 is situated between the second face 142 of the rebound piston 136 and the inner end 46 of the upper leg 30. It is understood that the volumetric size of the second compression zone 196 is constant, but the volumetric size of the first normal zone 198 and the third rebound zone 198 vary depending upon the relative positioning of the upper leg 30 within the chamber 62 of the lower leg 32.

In operation, when the bicycle fork 12 encounters a bump force, the lower leg 32 is forced upwardly, as shown by arrow 192. This upwardly movement forces the upper leg 30 into the chamber 62 of the lower leg 32, causing the rebound piston 136 to move toward the stationary compression piston 134 within the cavity 50 of the upper leg 30. Movement of the rebound piston 136 toward the compression piston 134 reduces the volumetric size of the first normal zone 194, forcing the oil bath 42 to displace to make room for the rebound shaft 68. The oil 42 is displaced through the peripheral and central oil flow apertures 126, 124 in the inner disc 108, and out from the aperture 127 into the second compression zone 196, creating compression damping, as shown by arrows 202.

The rebound piston 136 does not substantially effect this compression damping. On a compression stroke of the fork leg 18, as shown by arrow 192, the rebound piston 136 and the movable valve 160 cooperate to act as a blow-off valve to eliminate a vacuum effect within the cavity 50. The piston 136 and valve 160 serve to minimize the effect of the rebound piston 136 on the compression damping. As shown in FIG. 6, oil flow into the spaced-apart slots 146 in the first face 140 of the rebound piston 136 forces the movable valve 160 to move against spring 162 away from the second face 142 of the piston 136. Oil is free to flow, as shown by arrow 200, into the third rebound zone 198 as the upper leg 30 moves into the chamber 62 of the lower leg 32.

When compression force is relieved, a compression spring (not shown) in the opposite fork leg 19 presses on the lower leg 32 away from the crown 16. This movement is transferred to the first fork leg 18 through the dropouts 34 that are commonly mounted on a bicycle wheel (not shown). The speed at which the compression spring (not shown) is able to press the lower leg 32 away from the crown 16 is adjusted by the rebound adjustment mechanism 168 in the lower leg 32 of fork leg 18.

Rebound damping is achieved by oil transferring from one side of the rebound piston unit 40 to the other. See arrows 205. The movable valve 160 is pressed against the second face 142 of the piston 136 during the expansion stroke. See FIG. 7. During expansion stroke the compression piston 134 and the movable valve 154 cooperate to act as a blow-off valve and permit rapid fluid flow through the spaced-apart apertures 148 in the piston 134. Oil flow into the apertures 148 in the second face 142 of the compression piston 134 forces the movable valve to move against spring 156 away from the first face 140 of the piston 134. Oil is free to flow, as shown by arrow 203, back into the first flow zone 194 as the upper leg 30 moves out of the chamber 62 of the lower leg 32.

Figure 8:
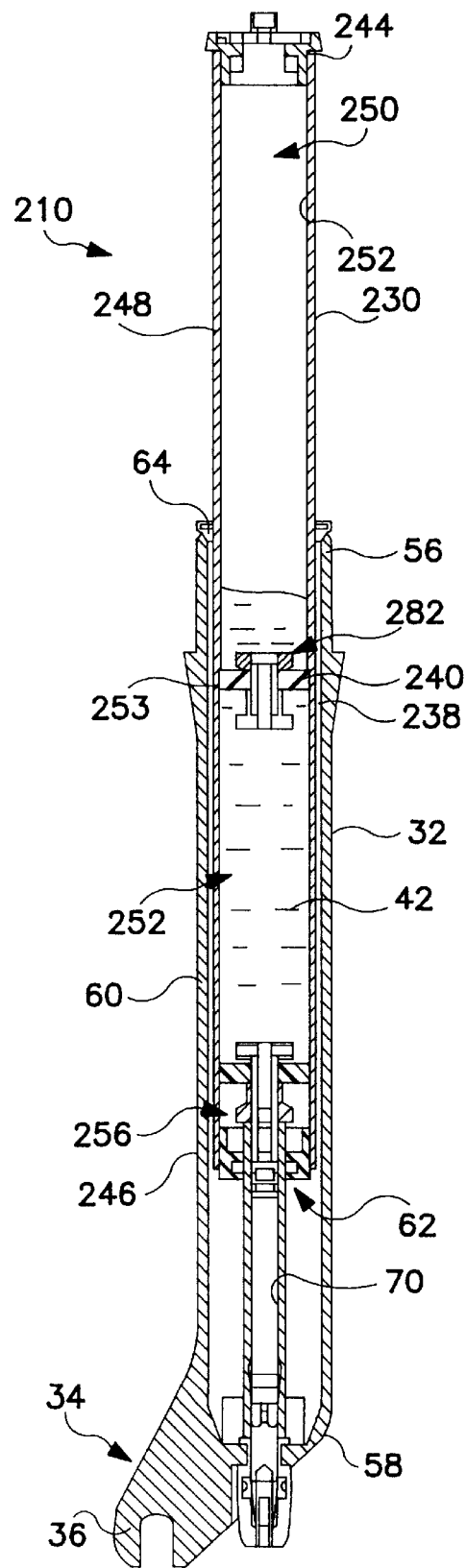
FIG. 8 is a cross-sectional view of an alternative embodiment of the damping apparatus showing a compression piston unit and an adjustable rebound piston unit.

In an alternative embodiment of the present invention, a damping apparatus 210 is provided that includes an upper leg 230 that is formed for slidable extension into the lower leg 32. See FIG. 8. The upper leg 230 includes opposite ends 244, 246, and a center portion 248 that is formed to include an interior face 252 that defines a cavity 250 and that forms a valve seat 253 thereon. The damping apparatus 210 also includes a compression piston unit 238 situated within the cavity 250 of the upper leg 230 and the adjustable rebound piston unit 40, illustrated in FIG. 2. The unit 40 is coupled to the lower leg 32, and formed to extend into the cavity 250 of the upper leg 230.

The cavity 250 of the upper leg 230 is formed in three zones 252, 254, 256 that correspond generally with the normal first flow zone 194, the second compression zone 196, and the third rebound zone 198, respectively, of the apparatus 10. The compression piston unit 238 is semi-press fit against the valve seat 253 in the first zone 252 and the rebound piston unit 40. The compression unit 238 includes a compression coupler 282 having a compression piston 240 and shim stack (not shown) mounted thereon. The compression coupler 282 is formed in the same manner as coupler 82, except that coupler 82 has threads 130 for secure engagement with the shaft 66.

In operation, upon experiencing the force of a bump, the lower leg 32 moves over the center portion 244 of the upper leg 230. This movement forces the rebound shaft 68 into the cavity 250 toward the valve seat 253 and the oil 42 to flow through the compression piston unit 238, as previously described, into the compression zone 254. Since the apparatus 210 lacks a compression adjustment mechanism, the amount of compression damping cannot be adjusted by the bicycle rider. The apparatus 210 does, however, include the rebound adjustment mechanism 168. Thus, the oil freely flows through the slots 146 formed in the rebound piston 136, as previously described, into the third zone 256 during compression of the apparatus 210. During expansion movement, however, the oil 42 must flow substantially through the central oil flow aperture 124 of the coupler 84. The speed of this flow is altered by driving the needle into and out of the passage 72 of the shaft 68.

In yet another alternative embodiment of the present invention, a damping apparatus 310 is provided that includes the upper leg 230 that is formed for slidable extension into the lower leg 32. See FIG. 9. The upper leg 230 is formed, as previously described, and the compression piston unit 238 is semi-press fit against seat 253 within the first zone 252 of the cavity 250. The damping apparatus 310 also includes a rebound piston unit 340 coupled to the lower leg 32 and formed to extend into the cavity 250 of the upper leg 230.

The rebound piston unit 340 includes the coupler 40, the rebound shaft 68, and the rebound piston 136, as previously described. In preferred embodiments, the shaft 68 is solid. It is understood, however, that the central oil passage 124 through the outer disc 108 could also be sealed to prevent oil therethrough. Since the apparatus 310 lacks a compression adjustment mechanism and a rebound adjustment mechanism, the bicycle rider will not have the ability to adjust the amount of compression damping or rebound damping without dissembling the apparatus or changing the weight of the oil.

Ideally, the damping system of the present invention is designed with the compression spring (not shown) in one leg of the fork 19, and the damping apparatus 10 in the other leg 18, but a fork 12 can be designed to work with springs on both legs 18, 19 by mounting an external spring (not shown), similar to a rear shock, or by mounting the springs underneath the inner leg 30, inside the chamber 62 outer leg 32.

Figure 10:
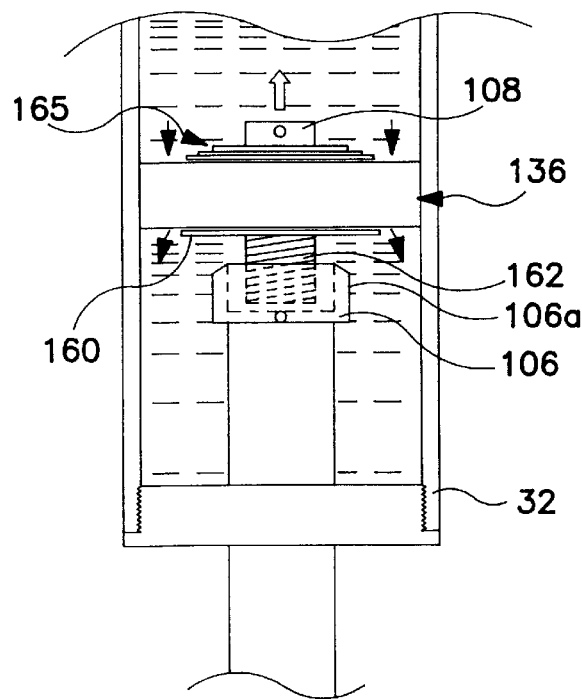
FIGS. 10 and 11 are diagrammatic illustrations of another embodiment of the damping apparatus showing the action of the rebound piston blow-off valve on low velocity and high velocity compression strokes.
Figure 11:
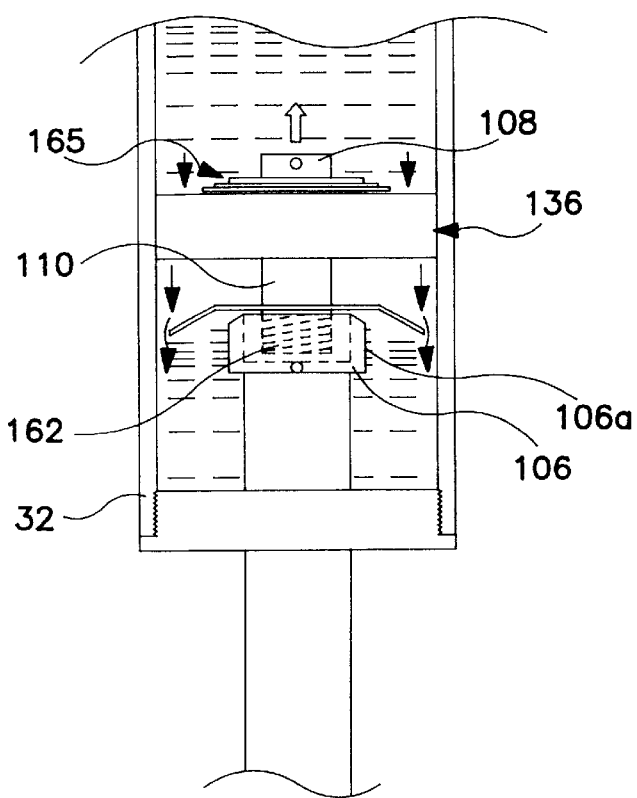

FIGS. 10 and 11 illustrate the operation of the rebound piston unit when a flexible valve 160 is utilized. As shown in FIG. 10, when a compression force, indicated by arrow 192, causes a relatively low velocity movement of lower leg 32 on a compression stroke, damping fluid will pass through slots 146 and push valve 160 against spring 162. For these low velocity movements, valve 160 will not fully compress spring 162, as moving valve 160 part way along post 110 of coupler 84 provides sufficient blow-off on the compression stroke.

On high velocity movements of lower leg 32 on the compression stroke, damping fluid will flow through slots 146, as shown, and press valve 160 against extended walls 106a, which have been added to disc 106. As the pressure of the damping fluid against valve 160 increases, valve 160 will flex, as shown, thereby providing smoother compression damping.

Figure 12:
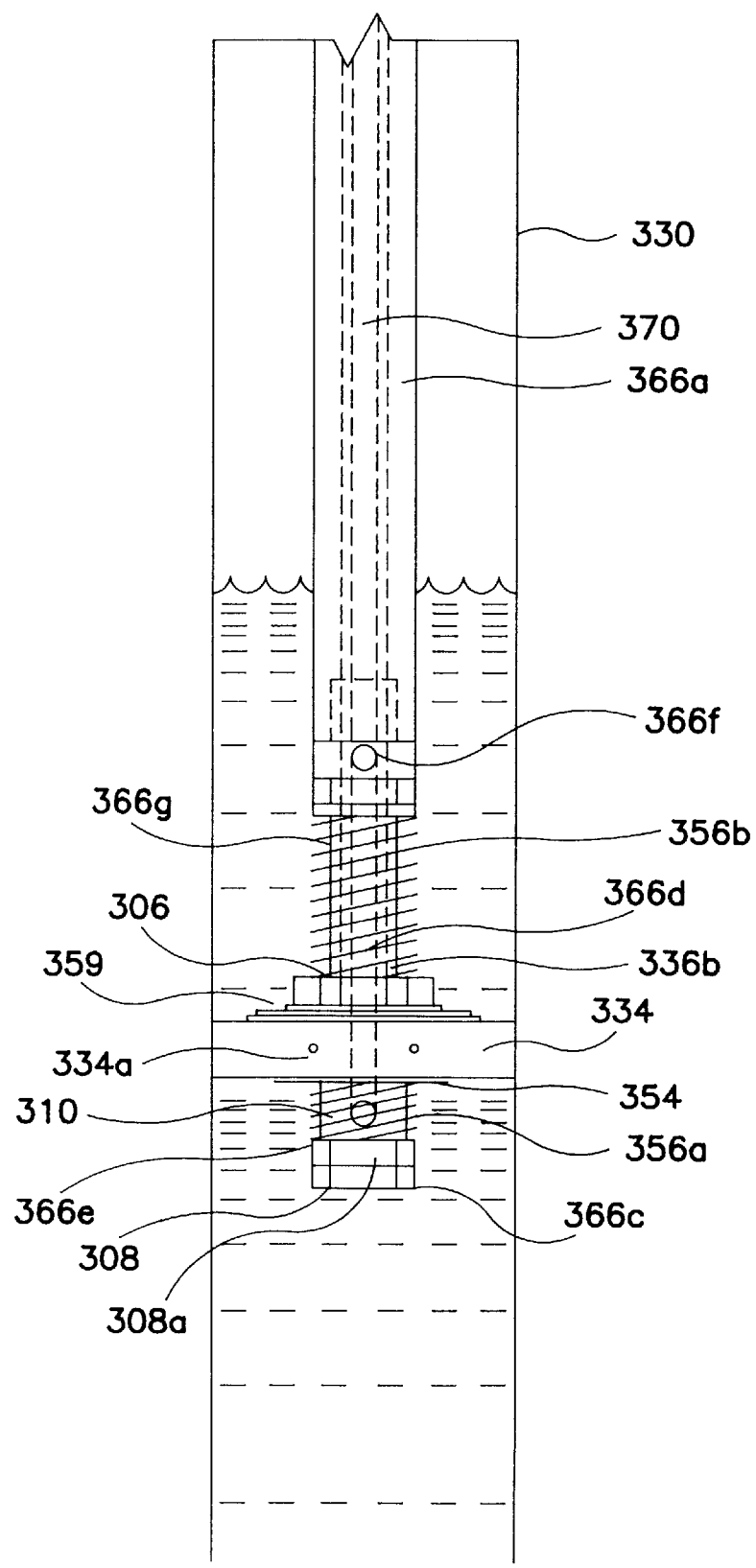
FIG. 12 illustrates another embodiment of a compression piston unit for a damping apparatus.
Figure 13:
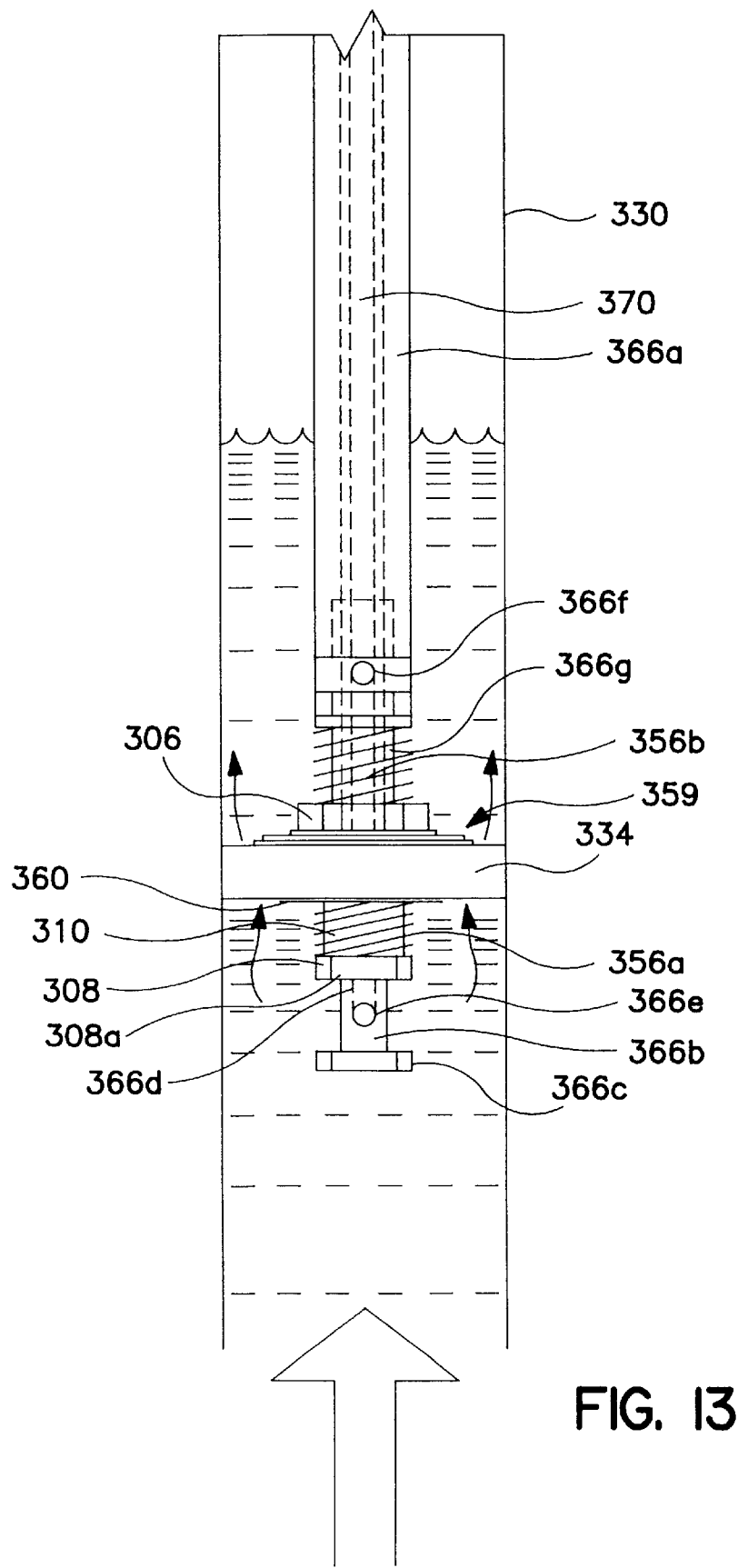
FIG. 13 illustrates the compression piston unit of FIG. 12 when a compression force is applied to the damping apparatus.

FIGS. 12 and 13 show another embodiment of a compression piston unit. In this embodiment, a shaft 366b is disposed within shaft 366a. Shaft 366b terminates in a first stop 366c. A passage 366d extends along the interior of shaft 366b and includes a lower aperture 366e and an upper aperture 366f. The longitudinal axis of passage 366d is generally parallel to and generally coincident with the longitudinal axis of shaft 366a and 366b. Apertures 366e and 366f are generally transverse to the longitudinal axis of passage 366d. Needle 370 extends down through shaft 366b and is adjustable with respect to aperture 366f in a manner similar to that described above for needle 170 in the embodiment of FIG. 2. A second stop 366g is attached to the lower end of shaft 366a. Stop 366g can be secured to shaft 366a in any number of ways, including threading it into shaft 366a. A spring 356b is disposed about stop 366g.

Piston 334 includes slots 346 (not shown) and apertures 348 (also not shown) corresponding to slots 146 and apertures 148 in the embodiment of FIG. 3. A central bore is provided through lock nut 306, disk 308, post 310, piston 334, valve 354, and the various shims in shim stack 359 to accommodate shaft 366b. Note that disk 308 includes a tapered inner area 308a. Disk 308 may be provided with oil flow apertures corresponding to apertures 126 of the embodiment of FIG. 3. An o-ring or similar seal 334a is provided in piston 334 and rides along shaft 366b, as described below.

In its initial, uncompressed state, piston 334 is at the lower end of shaft 366b such that disk 308 rests on stop 366c. As a compression force, as indicated by arrow 192, is applied to the lower leg (not shown), the lower leg and its rebound shaft will enter upper leg 330 thereby displacing damping fluid upwardly. As this occurs, piston 334 and the other components joined by coupler 382 begin to rise along shaft 366b. As this occurs, the tapered area 308a within disk 308 slowly exposes aperture 366e, thereby allowing damping fluid to flow within passage 366d and through aperture 366f. Note that as piston 334 rises, valve 354 remains against piston 334 and seals off apertures 348 (not shown). Likewise, the members of shim stack 359 remain disposed over slots 346. As the damping fluid continues to rise, piston 334 will eventually raise to the point where lock nut 306 abuts stop 366g. At this point, an increase in the damping fluid pressure will cause damping fluid to flow through slots 346 and past the shims in stack 359, as shown. Note that damping fluid also continues to flow in aperture 366e, through passage 366d and out aperture 366f. The compression damping can be controlled in various ways, as by adjusting needle 370. Similarly, compression damping can be adjusted by shortening or lengthening stop 366g, such that lock nut 306 engages it earlier or later in the compression stroke. Alternatively, shafts 366b of various lengths can be utilized, thereby again effectively controlling when in the compression stroke lock nut 306 will engage stop 366g.

Figure 14:
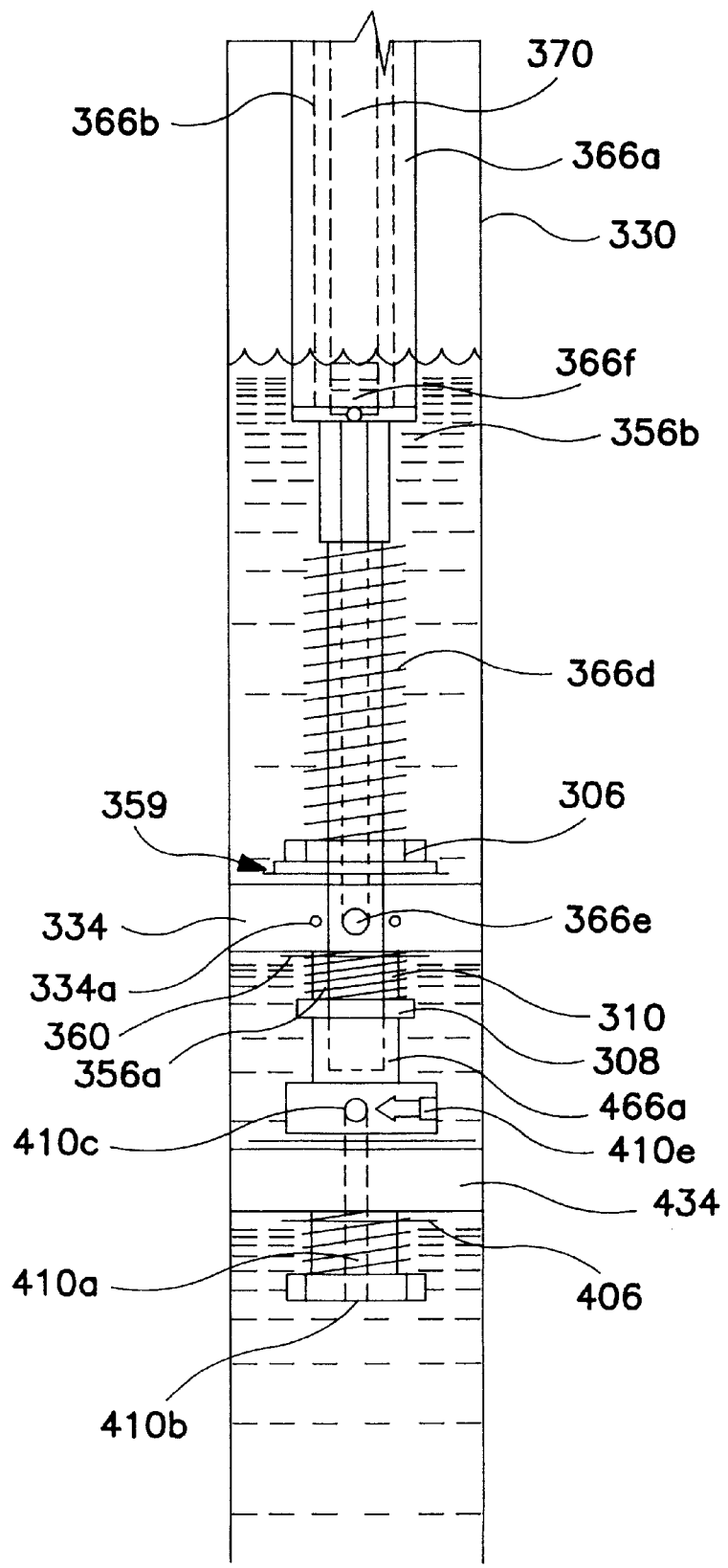
FIG. 14 is another alternative embodiment of a compression piston unit for the damping apparatus.
Figure 15:
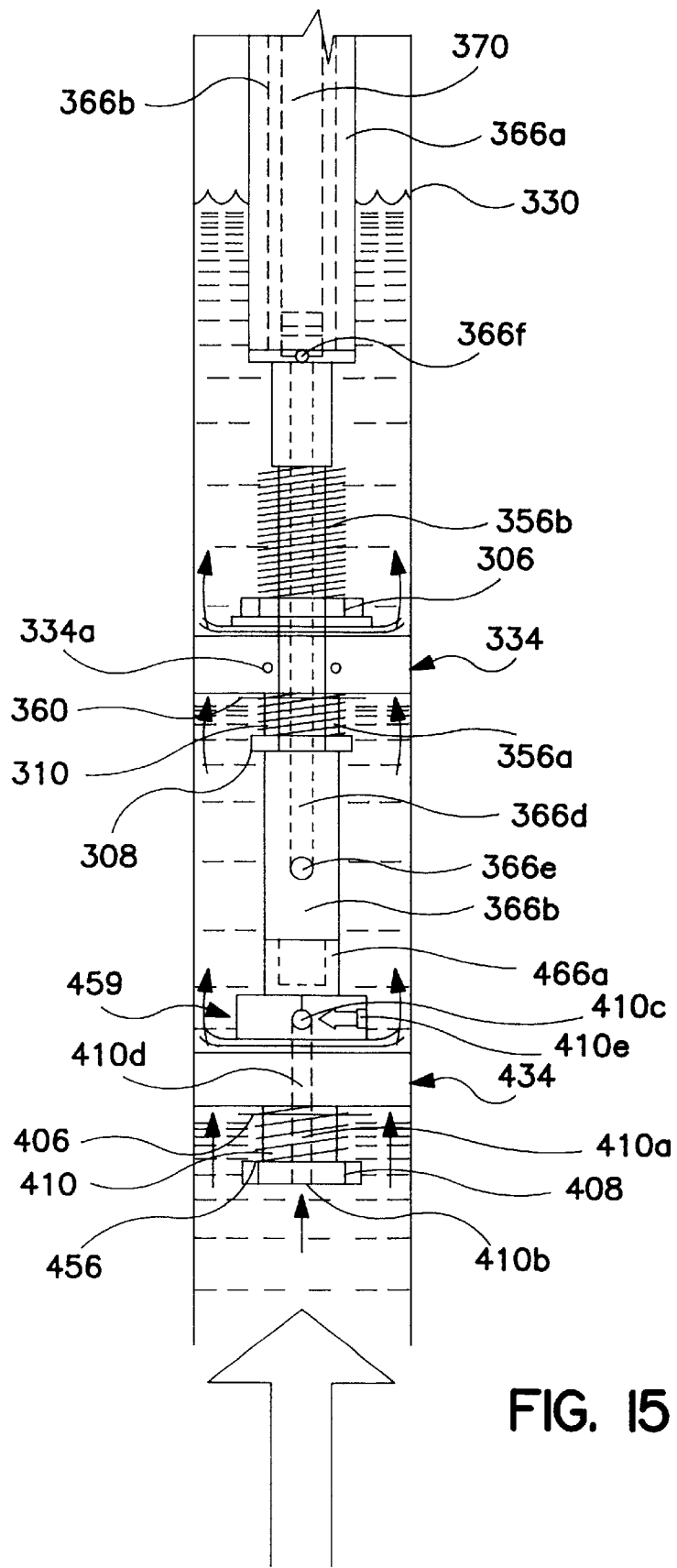
FIG. 15 illustrates the embodiment of FIG. 14 when a compression force is applied to the damping apparatus.

FIGS. 14 and 15 show yet another embodiment of the present invention. This embodiment differs from that of FIGS. 12 and 13 in that a stop 466a is attached to the lower end of shaft 366a and supports a stationary compression piston 434 and its associated components. A passage 410a extends through disk 408, post 410, and disk 406. Passage 410a has an aperture 410b at one end thereof and an aperture 410c at the other end. Disk 408 may be provided with openings corresponding to oil flow apertures 126 in the embodiment of FIG. 3. Piston 434 includes slots 446 (not shown) and apertures 448 (not shown). A needle or set screw 410e is provided in disk 406 transverse to the axis of passage 410a. Needle or set screw 410e may be used to adjust the amount of bleed through aperture 410c in a manner similar to the use of needle 370.

Figure 16:
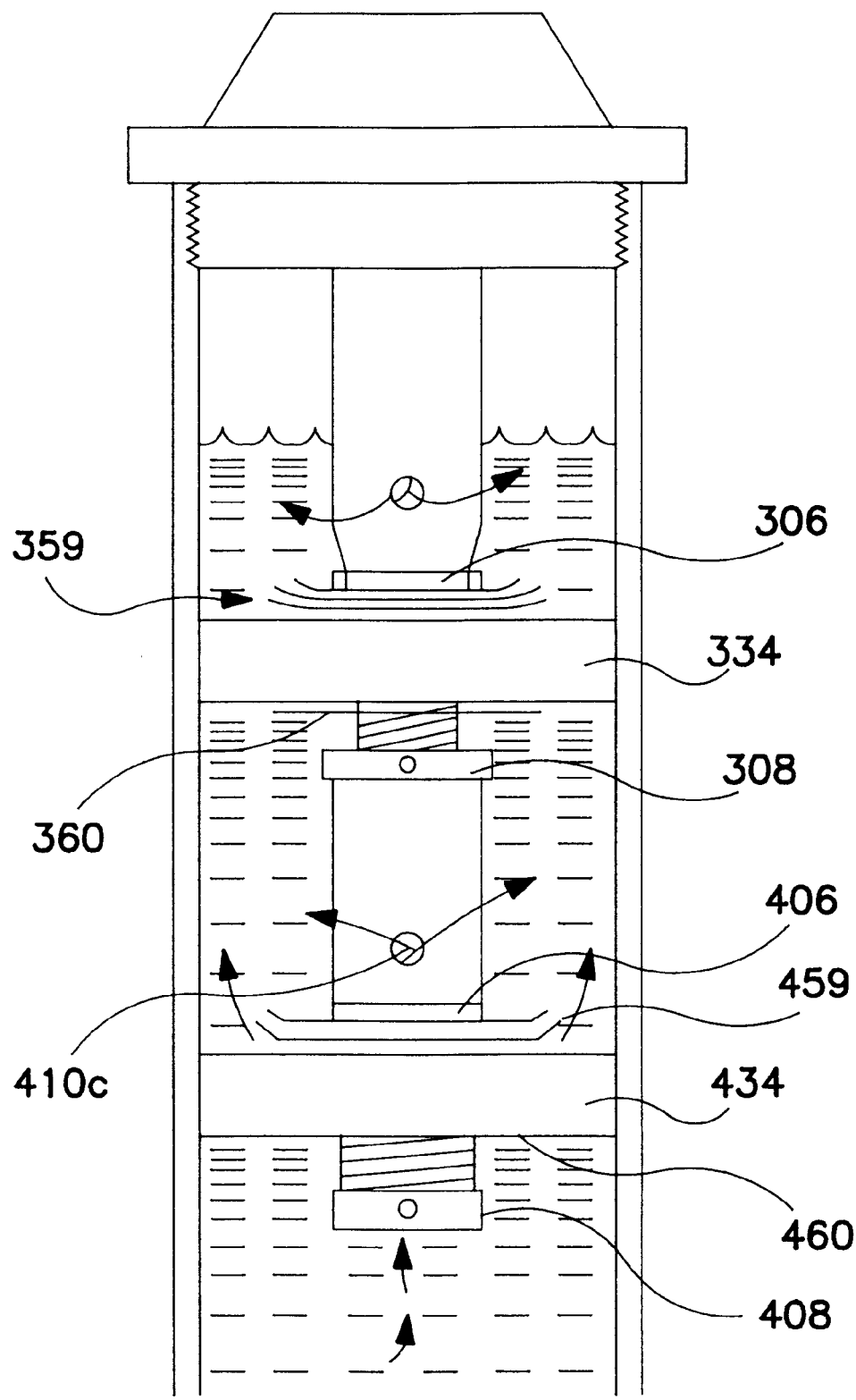
FIG. 16 is a diagrammatic illustration of another embodiment of the damping apparatus.

In this embodiment, as a compression force, indicated by arrow 192, is applied, the damping fluid will rise within leg 330, and flow from aperture 410b through passage 410a and out aperture 410c. Likewise, damping fluid will flow past the shims in stack 459. As fluid flows to the same side of piston 434, it will rise along shaft 366a in the manner described with respect to the embodiments of FIGS. 12 and 13. As this occurs, aperture 366e will be exposed and damping fluid will flow from that aperture through passage 366d and out aperture 366f. When piston 334 has reached its maximum range of travel (FIG. 15), oil will flow through piston 334 and past the shims in stack 359, as described above. Again, by adjusting the length of shaft 366a and the lengths of stops 366g and 466a, the point in the compression stroke at which the various pistons, passageways, and apertures come into play can be controlled. Note that the embodiment of FIGS. 14 and 15 could also be modified such that both compression piston assemblies 334 and 434 are stationary. This is schematically shown in FIG. 16.

Figure 17:
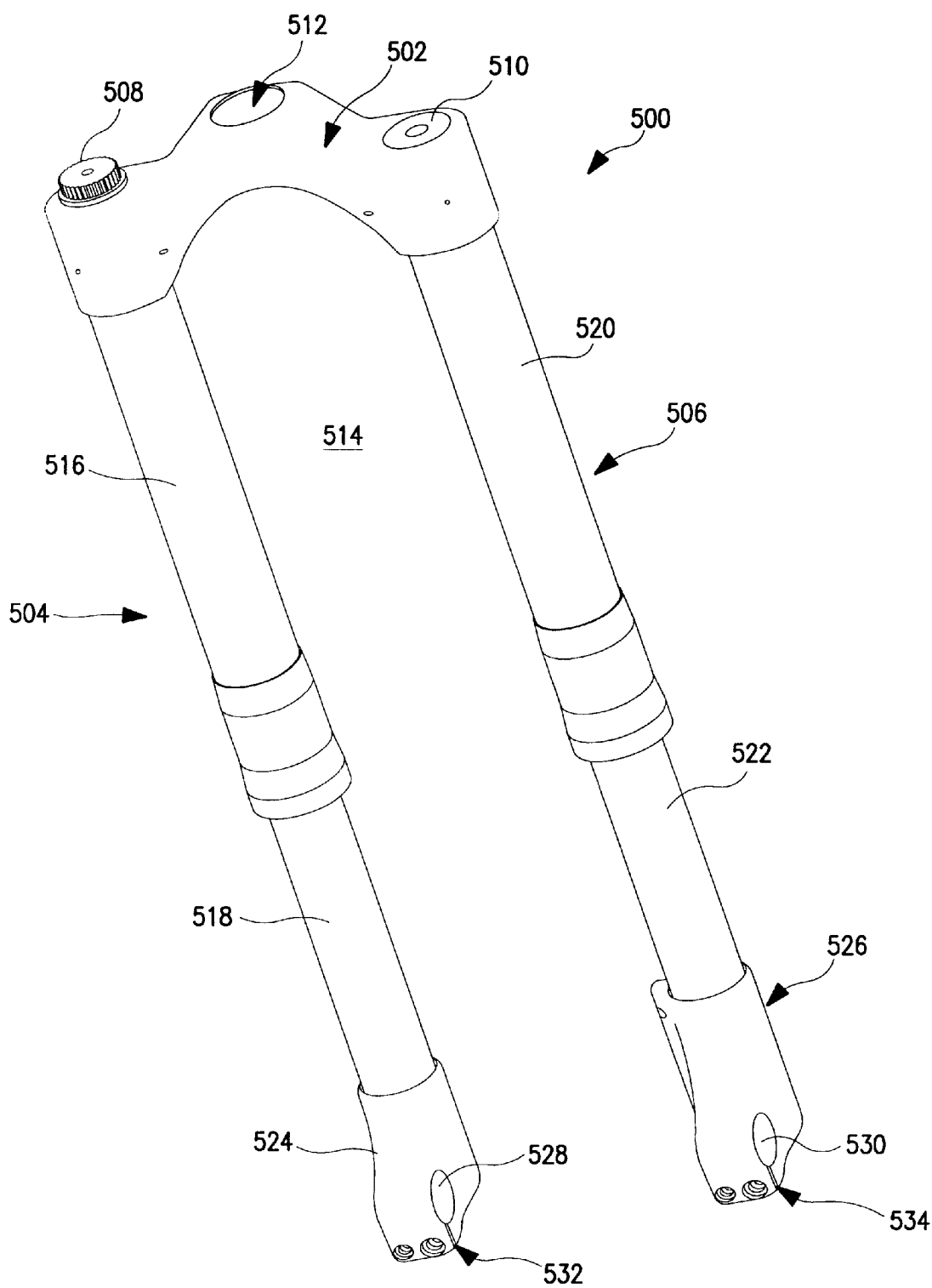
FIG. 17 is a perspective view of another illustrative embodiment of a bicycle fork.
Figure 18:
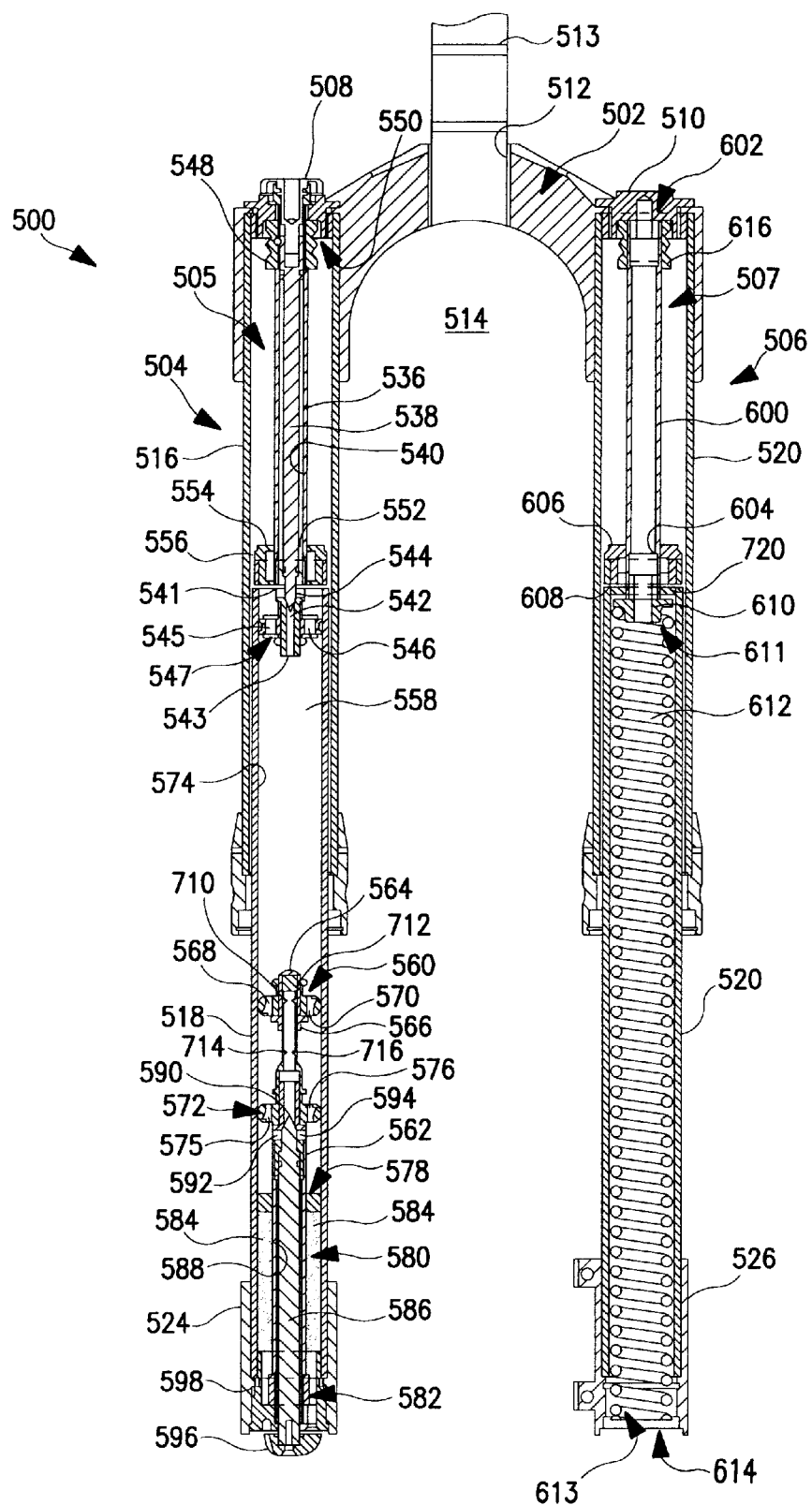
FIG. 18 is a front-elevational cross-sectional view of the fork of FIG. 17.
Figure 19:
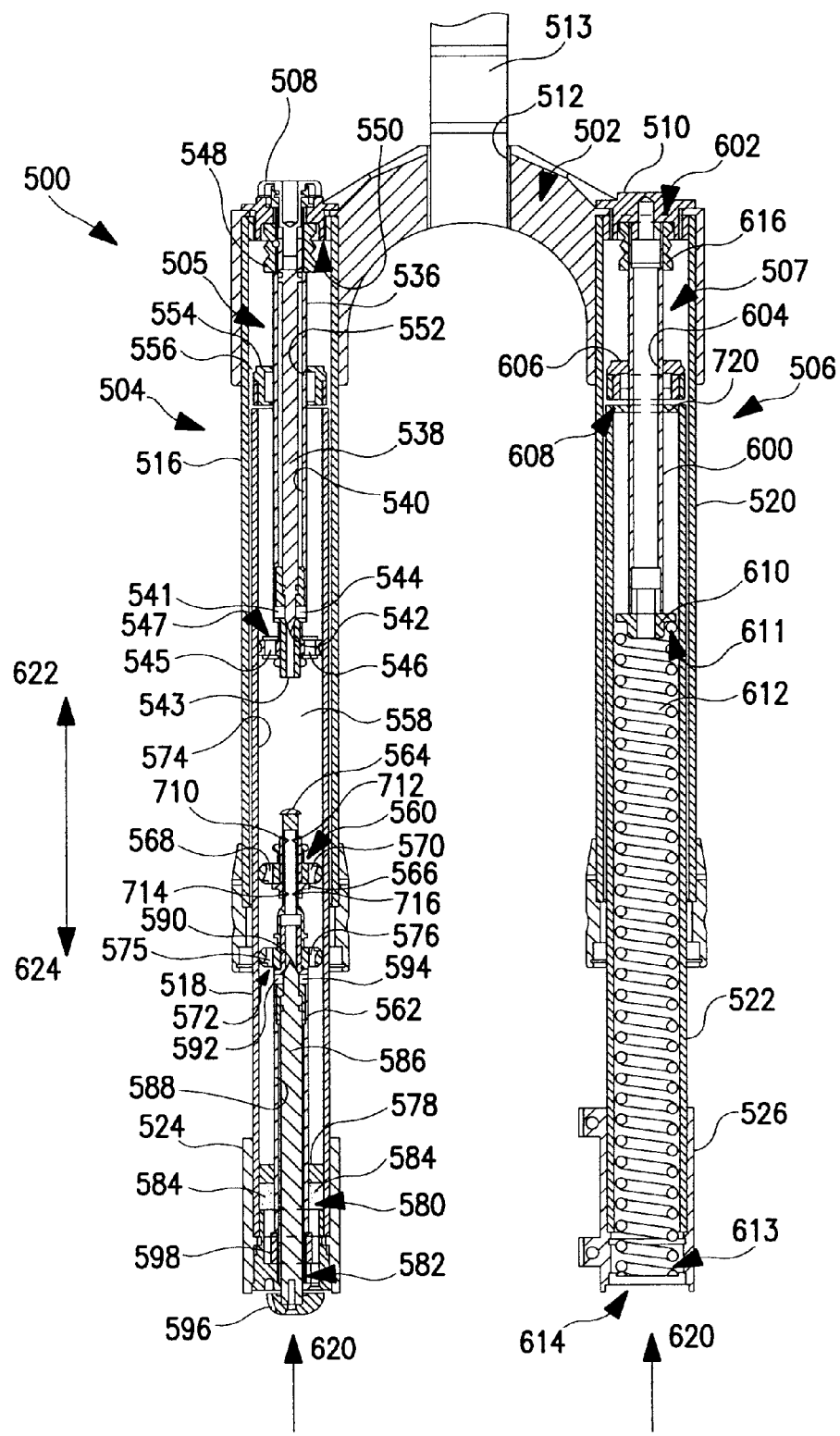
FIG. 19 is a front-elevational cross-sectional view of the fork of FIG. 17 with a force being applied to the fork.

Another illustrated embodiment of a bicycle fork is indicated by reference numeral 500 and shown in FIGS. 17 through 19. Fork 500 comprises a crown 502 that includes a pair of downwardly extending legs 504, 506. Leg 504 comprises an adjuster knob 508 extending from crown 502. Leg 506 includes a top cap 510 extending from crown 502. Between adjuster knob and top cap 508, 510, a bore 512 is disposed through crown 502, configured to receive a steering column 13 that couples to the bicycle. (See FIGS. 18 and 19.) A space 514 is provided between legs 504, 506 for receiving a bicycle tire (not shown).

Each leg 504, 506 comprises a pair of telescoping outer and inner cylinders 516, 518 and 520, 522. Extending from lower cylinders 518, 522 are dropouts 524, 526. Each dropout 524, 526 includes a laterally extending bore 528, 530. An axle (not shown) disposed through each bore 528, 530 is secured into place by pinch mechanisms 532, 534. The axle supports the wheel (not shown) positioned in space 514. As shown in FIGS. 18 and 19, each leg 504, 506 comprises different damping systems. Leg 504 comprises an energy damping system 505, and leg 506 comprises a spring system 507. Energy damping system 505 in leg 504 includes a rebound shaft 536 extending downwardly from cap 508. A needle 538 is extended through a hollow bore 540 in shaft 536. Similar to the previous embodiments, needle 538 has a pointed end 542 occluding opening 543, and extending past openings 541, 544. Needle 538 may be adjusted to serve as a rebound adjustment mechanism. It is contemplated that by moving needle 538 to various positions relative to openings 541, 543, and 544 the amount and rate fluid that can enter cylinder 518 is regulated. Specifically, this relative positioning alters the flow diameter of openings 541, 543, and 544 and, thus, the ability of the oil to flow through those openings. The less oil that can flow through these openings, the slower the fork will rebound.

A bottom-out spacer 548 is positioned adjacent end 550 of outer cylinder 516. The bottom-out spacer 548 is a resilient member that provides cushioning to cylinder 518 and limits the extent it can travel within cylinder 516. If cylinder 518 extends into cylinder 516 too far, for example, instead of impacting end 550 of cylinder 516 and possibly causing damage to same, cylinder 518, will impact the resilient body of spacer 548, thereby preventing such damage.

A shaft 536 is disposed through a bore 552 of cap piston 554. Cap piston 554 is attached to end 556 of cylinder 518 thereby sealing end 556. A chamber 558 is provided in cylinder 518 that provides an open space to store fluid. Chamber 558 also receives rebound piston assembly 547. Opposite rebound piston assembly 547 is a piston 560. Piston 560 is disposed around shaft 562 adjacent inner wall 574 of cylinder 518. Piston 560 is a floating piston movable along shaft 562 within the confines of coupler 564 and flange 566 which are each positioned on opposite sides of piston 560 along shaft 562. Piston 560 includes slots or passageways 568, 570 disposed therethrough in communication with chamber 558. A stationary piston 572 is also disposed around shaft 562 adjacent inner wall 574 of cylinder 518. Piston 572 includes slots or passageways 575, 576 disposed therethrough, similar to passageways 568, 570. of piston 560. In contrast to piston 560, piston 572 is not movable relative to shaft 562 or cylinder 518.

A piston 578 is disposed around shaft 562 adjacent inner wall 574 of cylinder 518. Piston 578 is another floating piston movable along shaft 562. In the illustrated embodiment, piston 578 serves as the partition between fluid chamber 558 and a compensating chamber 580. Compensating chamber 580 is provided at the lower end of inner cylinder 518 between end 582 and piston 578. A resilient or bias material 584, such as a foam, air/gas or spring, is positioned within chamber 580 to bias piston 578 upwardly. It is contemplated that the upward bias of material 584 be sufficient to carry the fluid in chamber 558. It is contemplated that piston 578 is movable as force from the fluid is directed downwardly against piston 578, as discussed further herein.

Similar to shaft 536, shaft 562 includes a needle 586 extending through a hollow bore 588 of shaft 562. Similar to needle 538, needle 586 has a pointed end 590 occluding openings 592, 594 in shaft 562. It is contemplated that, by moving needle 586 to various positions relative to openings 592, 594 (i.e., an adjustment range), the fluid flow from the cylinder 518 through cap 596 may be regulated, as previously discussed, regarding openings 544, 546. Cap 596 includes a detent 598 positioned about the periphery of shaft 562 and adjacent end 582. Detent 598 serves as an indicator to allow the user to know the location of needle 586 in the adjustment range, as well as assist in maintaining needle 586 in that location.

Spring system 507 of leg 506 comprises a compression rod 600 extending downwardly from the top end 602 of cylinder 520, as shown in FIG. 18. Compression rod 600 extends through a bore 604 disposed through cap piston 606, and is attached to end 608 of lower cylinder 522. An end piston 610 is attached to the end of rod 660 within cylinder 522. In the illustrated embodiment, end piston 610 is illustratively an inverted "cap" shape to receive end 611 of a spring 612 extending a substantial length of inner cylinder 522. End 613 of spring 612, opposite end piston 610, abuts end 614 of cylinder 522. It is contemplated that spring 612 can be a heavy gage spring sufficient to carry the weight of the bicycle. It is further contemplated that other means may be used, including a gas, elastomer, or other resilient material or structure.

A top-out spacer 720 is disposed about shaft 600 between end 608 and piston 610. Spacer 720 is illustratively a resilient spacer configured to receive the impact of piston 10. The force of the impact is absorbed by spacer 720 to prevent damage to end 608.

A bottom-out spacer 616, similar to spacer 548, is positioned adjacent end 602 of outer cylinder 520. Bottom-out spacer 616 provides cushioning to cylinder 522 and limits the extent it can travel into cylinder 520. If cylinder 522 extends into cylinder 520 too far, instead of impacting end 602 of cylinder 520, possibly damaging same, cylinder 520 will impact the cushioned body of spacer 602, thereby preventing such damage.

The effect of a force 620 applied upwardly against fork 500 is shown in FIG. 19. As force 620 is applied to legs 504, 506, inner cylinders 518, 522 both move in concert in direction 622, extending further into upper cylinders 516, 520, respectively. In the case of cylinder 518, the further cylinder 518 extends into cylinder 516, the further shaft 536 extends into chamber 558. The space occupied by shaft 536 displaces the fluid. This displacement of fluid in chamber 558 forces the fluid through passageways 544, 543, 545, 546, 568, 560, 575, 576, 710, 712, 714 and 716. It will also cause the fluid to apply a force downwardly against piston 578 to compensate for the displacement caused by shaft 536. Because piston 554 is stationary relative to chamber 558, the only direction for chamber 558 to expand to accommodate both shaft 536 and the fluid is downwardly, driving piston 578 in direction 624 against the bias of material 584. By driving piston 578 in direction 624, chamber 558 is sufficiently expanded to accommodate both shaft 536 and the fluid. These interactions create the damping effect by absorbing force 620 in the form of heat which is dissipated through leg 504. Note that the flow of fluid through passageways 710, 712, 714 and 716 is metered by needle 586.

Similarly, in response to force 620, cylinder 522, too, extends further into cylinder 520, such that rod 600 extends into cylinder 522, as shown in FIG. 19. End piston 610, thus, drives spring 612 in direction 624, causing spring 612 to compress. This compression of spring 624 is followed by its return in direction 622. The dampening of the force is not substantial, but leg 506 does assist in returning both legs 504, 506 to their original positions after force 620 is applied. It is appreciated that legs 504, 506 will act in concert due to both dropouts 524, 526 being coupled to the axle of the bicycle wheel.

Figure 20:
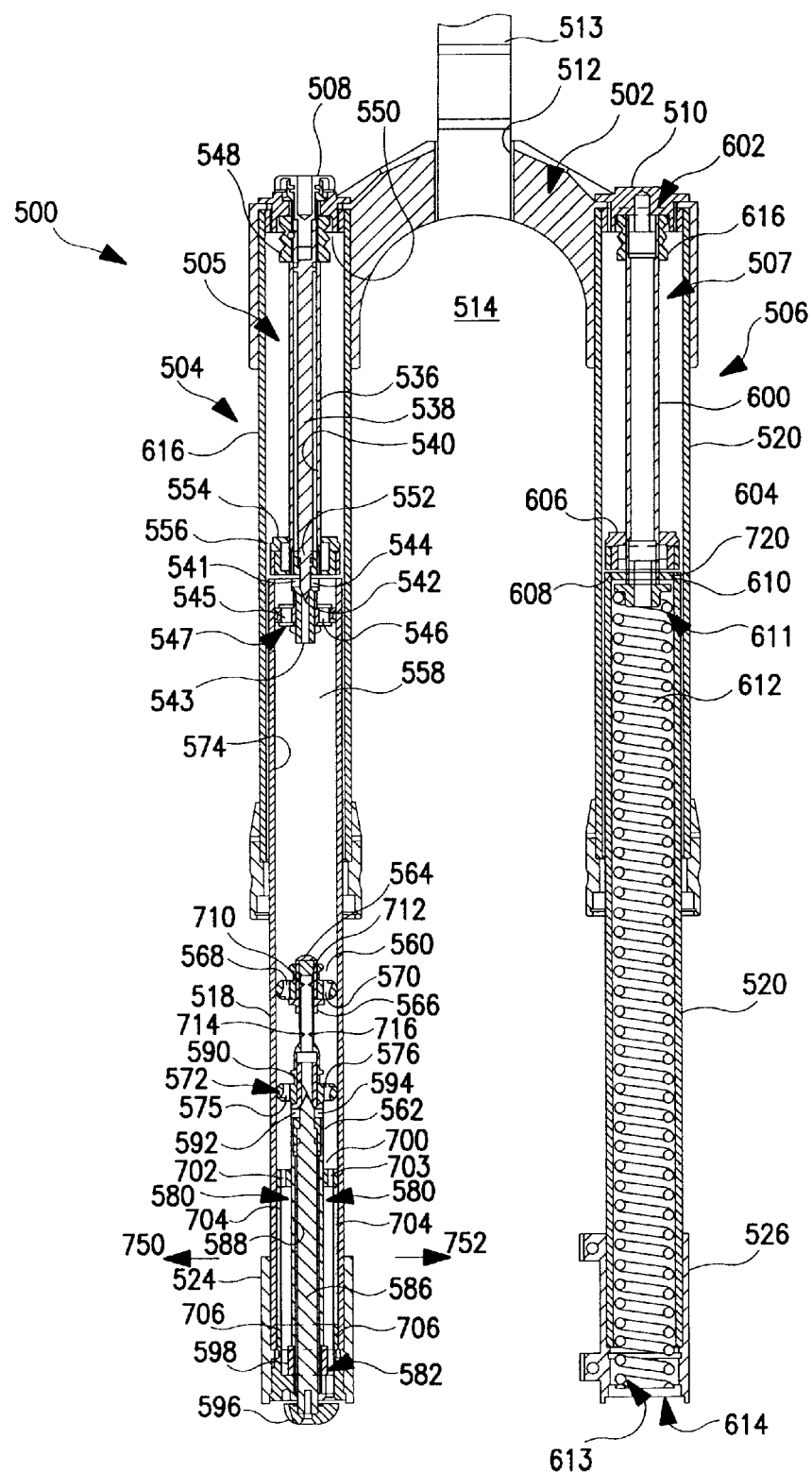
FIG. 20 is a front-elevational cross-sectional view of still another embodiment of the damping apparatus.
Figure 21:
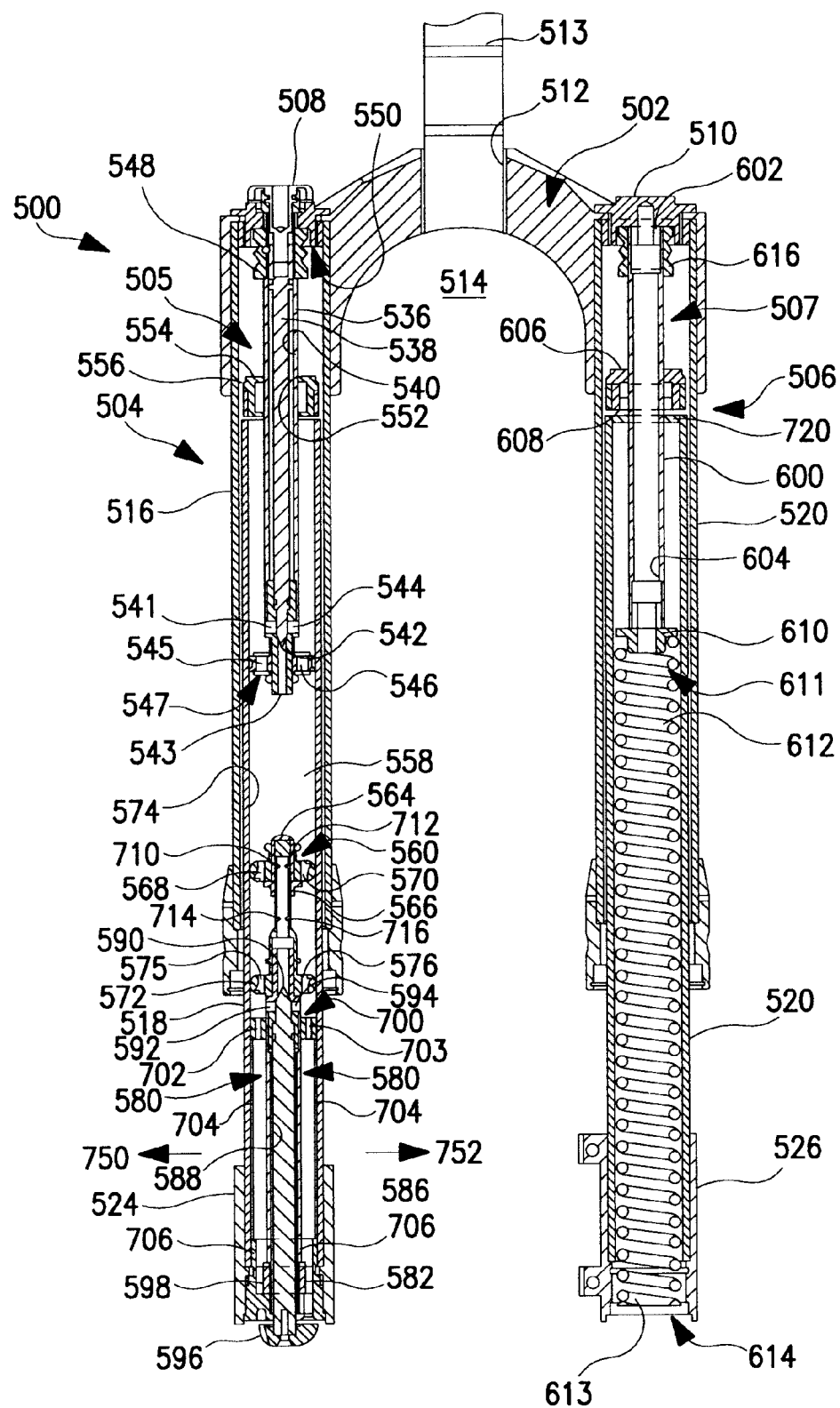
FIG. 21 is a front-elevational cross-sectional view of the damping apparatus of FIG. 20 with a force being applied to the fork.

In still another embodiment, fork 500 comprises a retainment piston 700 which is disposed around shaft 562 adjacent inner wall 574 of cylinder 518. (See FIGS. 20 and 21.) Retainment piston 700 is movable along shaft 562 that also includes fluid flow passageways 702, 703. Passageways 702, 703 permit communication between chambers 558 and 580, thus, allowing fluid to pass therebetween. A resilient or bias material, like a foam cylinder 704, is located about inner wall 574 adjacent collar 706 and chamber 580, supporting and biasing retainment piston 700 upwardly. It is contemplated that piston 700 can be stationary.

When cylinders 516, 518 are in their at-rest position, fluid is located in both chambers 558, 580. As an upward force is applied against fork 500, similar to force 620 shown in FIG. 19, inner cylinders 518, 522 both move in concert in direction 622, extending further into upper cylinders 516, 520, respectively. In the case of cylinder 518, the further it extends into cylinder 516, the further shaft 536 extends into chamber 558, similar to the previous embodiments shown in FIGS. 18 and 19. The space now occupied by shaft 536 causes the fluid to be displaced. As the fluid is displaced, it exerts a force in directions 750 and 752 within chamber 580, lateral to the direction of movement of cylinder 18. This force causes foam cylinder 704 to compress against inner wall 574. (See FIG. 21.) It is contemplated that the volume of space occupied by foam cylinder 704 while fork 500 is at rest is proportional to the volume of space occupied by shaft 536 disposed within chamber 558 while a force is applied against fork 500. The volume of cylinder 704 will be replaced by the displaced fluid helping create the dampening effect. When cylinder 518 rebounds, the space in chamber 558, made available from shaft 536 exiting chamber 536, along with the resilient nature of foam core 704, causes the fluid to move back to its original locations within chambers 558, 580. The legs 504, 506 subsequently move back to their at-rest position.

Although the apparatus has been described with reference to particular means, materials and embodiments, from the foregoing description, one skilled in the art can easily ascertain the essential characteristics of the illustrative apparatus and various changes and modifications may be made to adapt the various uses and characteristics without departing from the spirit and scope of the present invention as described by the claims which follow.

What is claimed is:

1. A bicycle fork having a damping apparatus, the damping apparatus comprising:
 a cylinder having a fluid chamber;
 a fluid located within the fluid chamber;
 a floating piston coupled to the cylinder configured to carry the fluid in the fluid chamber, and configured to be movable in response to a force applied to the floating piston by the fluid and
 a bias member located exterior of the fluid chamber, configured to carry the floating piston, and supported by a base that is stationary relative to the fluid chamber.

2. The damping apparatus of claim 1, wherein the floating piston defines one end of the fluid chamber.

3. The damping apparatus of claim 2, wherein the cylinder has a second chamber adjacent the fluid chamber and separated from the fluid chamber by the floating piston.

4. The damping apparatus of claim 3, comprising a member disposed in the cylinder configured to displace fluid and biasing same against the floating piston.

5. The damping apparatus of claim 4, wherein the bias member is located in the second chamber.

6. The damping apparatus of claim 5, wherein the fluid chamber is provided in an upper portion of the cylinder, and the second chamber is provided in a lower portion of the cylinder.

7. The damping apparatus of claim 6, wherein the floating piston maintains the fluid in the upper portion of the cylinder.

8. The damping apparatus of claim 7, wherein the force is an upward force applied to the cylinder that causes a downward force to be applied to the floating piston.

9. The damping apparatus of claim 8, comprising a member disposed in the cylinder such that as the upward force is applied to the cylinder the member extends into the fluid chamber to displace the fluid to cause the fluid to apply the downward force on the floating piston.

10. The damping apparatus of claim 5, wherein the bias member is a spring.

11. The damping apparatus of claim 5, wherein the bias member is a resilient material.

12. A bicycle fork having a damping apparatus, the damping apparatus comprising:

a cylinder having a fluid chamber;

a fluid located within the fluid chamber;

a first piston coupled to the cylinder, movable relative to the cylinder, configured to carry the fluid in the fluid chamber, and configured to be movable in response to a force applied to the first piston by the fluid;

a resilient member located exterior of the fluid chamber and configured to carry the first piston; and a second piston disposed in the fluid chamber and movable relative to the cylinder;

wherein the second piston is spaced apart from the resilient member.

13. The damping apparatus of claim 12, comprising a member disposed in the cylinder and extendable into the fluid chamber to displace the fluid to cause a second force from the fluid to be applied against the first piston.

14. The damping apparatus of claim 13, further comprising a second cylinder configured to telescopically receive the first cylinder, the member being attached thereto such that the extent the first cylinder is telescopically disposed in the second cylinder is proportional to the extent the member is extended into the fluid chamber.

15. The damping apparatus of claim 14, wherein the first cylinder has a second chamber adjacent the fluid chamber and separated from the fluid chamber by the first piston.

16. The damping apparatus of claim 15, wherein the resilient member is located in the second chamber.

17. A bicycle fork comprising:

a crown member;

a first leg depending from the crown member and comprising a damping apparatus, the damping apparatus comprising;

a cylinder having a fluid chamber;

a fluid located within the fluid chamber;

a floating piston coupled to the cylinder configured to carry the fluid in the fluid chamber, and configured to be movable in response to a force applied to the floating piston by the fluid;

a bias member located exterior of the fluid chamber, configured to carry the floating piston, and supported by a base that is stationary relative to the fluid chamber;

a second leg depending from the crown member and spaced apart from the first leg, and comprising a spring apparatus, the spring apparatus comprising, a second cylinder; and a spring disposed in the second cylinder;

the spring being configured to compress in response to the external force being applied to the second cylinder.

18. The bicycle fork of claim 17, wherein the spring apparatus includes a member disposed in the second cylinder and configured to engage the spring when the external force is applied to the second cylinder.

19. A bicycle fork having a damping apparatus, the damping apparatus comprising:

a cylinder defined by a longitudinally-extending inner wall and comprising coaxially-aligned first and second fluid chambers disposed within the cylinder;

a piston disposed within the cylinder to separate the first and second fluid chambers, the piston comprising at least one aperture disposed therethrough to allow communication between the chambers;

a fluid located within both the first and second chambers; and a resilient member located within the second chamber adjacent the inner wall, and located between the inner wall and a volume of the fluid;

wherein as a shock force is applied longitudinally against the cylinder the fluid in the second chamber is caused to apply a lateral force against the resilient member, compressing the resilient member against the inner wall, increasing the volume of the fluid that occupies the second chamber.

20. A bicycle fork having a damping apparatus, the damping apparatus comprising:

a first cylinder defined by a longitudinally-extending inner wall which defines a space, the cylinder includes a shaft longitudinally extending within a portion of the space;

a second cylinder defined by inner and outer walls and comprising coaxially-aligned first and second fluid chambers disposed therein, a portion of the second cylinder is coaxially and movably located within the first cylinder such that the outer wall of the second cylinder is adjacent the inner wall of the first cylinder and a portion of the shaft extends into the first chamber;

a fluid located within both the first and second chambers;

a piston disposed within the cylinder to separate the first and second fluid chambers, the piston comprising at least one aperture disposed therethrough to allow communication between the chambers; and a resilient member located within the second chamber adjacent the inner wall, and located between the inner wall and a volume of the fluid;

wherein as a shock force is applied longitudinally against the second cylinder it is caused to extend further into the space of the first cylinder to cause the shaft to extend further into the first fluid chamber and displace fluid from the first chamber into the second chamber through the aperture of the piston, the fluid that is displaced applies a lateral force against the resilient member, compressing the resilient member against the inner wall to allow an increase in volume of fluid that occupies the second chamber.

* * * * *